(12) United States Patent
Flowers et al.

(10) Patent No.: US 11,068,754 B1
(45) Date of Patent: *Jul. 20, 2021

(54) SYSTEMS AND METHODS REGARDING IMAGE DISTIFICATION AND PREDICTION MODELS

(71) Applicant: STATE FARM MUTUAL AUTOMOBILE INSURANCE COMPANY, Bloomington, IL (US)

(72) Inventors: Elizabeth Flowers, Bloomington, IL (US); Puneit Dua, Bloomington, IL (US); Eric Balota, Bloomington, IL (US); Shanna L. Phillips, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/372,824

(22) Filed: Apr. 2, 2019

Related U.S. Application Data

(63) Continuation of application No. 15/596,155, filed on May 16, 2017, now Pat. No. 10,289,938.

(51) Int. Cl.
*G06K 9/00* (2006.01)
*G06K 9/62* (2006.01)

(52) U.S. Cl.
CPC ....... *G06K 9/6277* (2013.01); *G06K 9/00845* (2013.01); *G06K 9/6232* (2013.01); *G06K 9/6256* (2013.01)

(58) Field of Classification Search
CPC ............. G06K 9/6277; G06K 9/00845; G06K 9/6232; G06K 9/6256
USPC ...................................................... 382/154
See application file for complete search history.

(56) References Cited

U.S. PATENT DOCUMENTS

| | | |
|---|---|---|
| 2013/0073114 A1 | 3/2013 | Nemat-Nasser et al. |
| 2015/0006117 A1 | 1/2015 | Zhang et al. |
| 2015/0098609 A1 | 4/2015 | Sarratt et al. |
| 2017/0132758 A1 | 5/2017 | Paluri et al. |
| 2017/0280130 A1 | 9/2017 | Burton |

*Primary Examiner* — Stephen P Coleman
(74) *Attorney, Agent, or Firm* — Marshall, Gerstein & Borun LLP

(57) ABSTRACT

Systems and methods are described for generating an image-based prediction model, where a computing device may obtain a set of 3D images from a 3D image data source. Each of the 3D images can have 3D point cloud data and a Distification technique can be applied to the 3D point cloud data of each 3D image to generate output feature vector(s). The output feature vector(s) may then be used to train and generate the image-based prediction model.

20 Claims, 8 Drawing Sheets

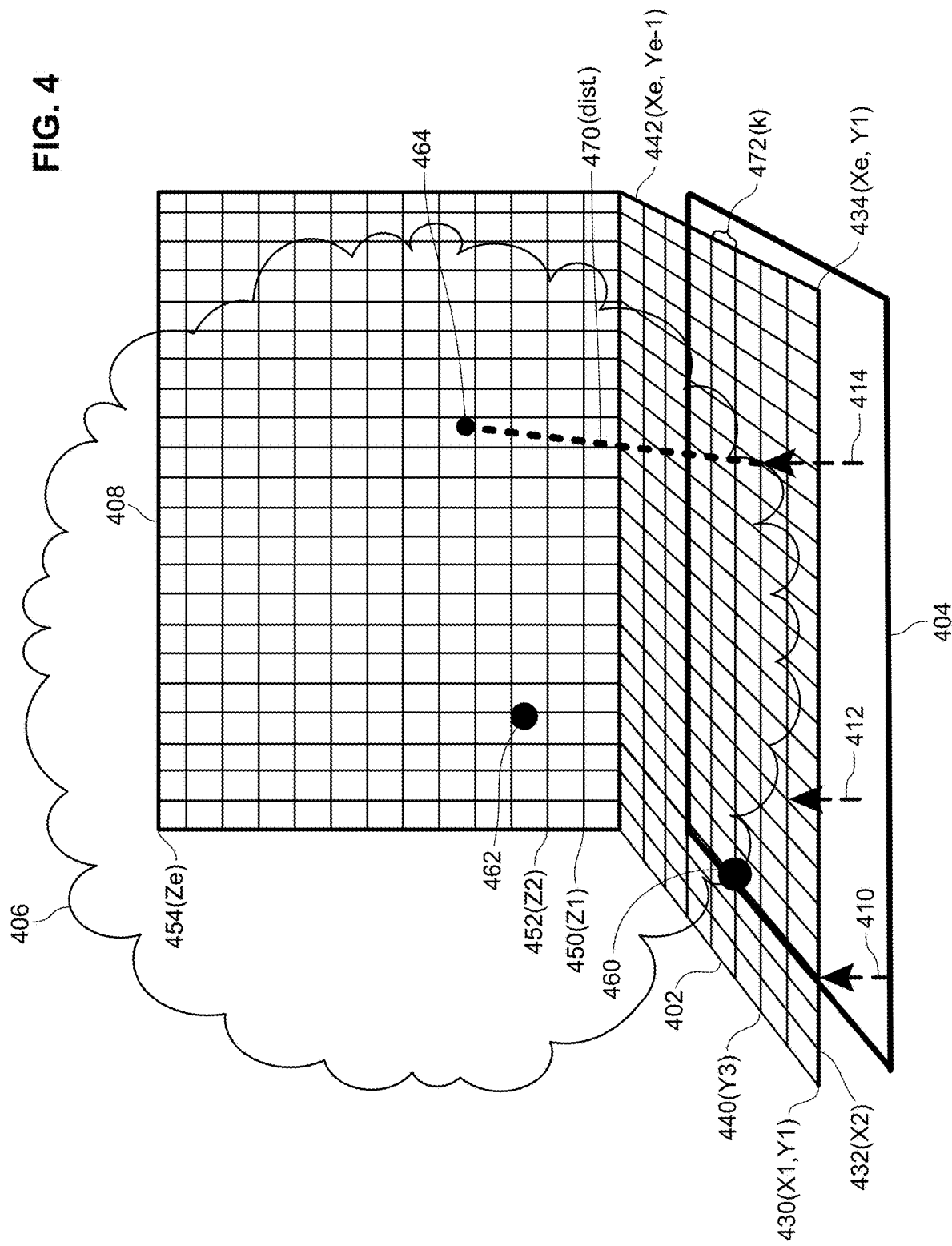

900

| n=72,000 | Predicted: No | Predicted: Yes |
|---|---|---|
| Actual: No | 7,000 | 3,000 |
| Actual: Yes | 2,000 | 60,000 |

{Aaron, 10:01, Normal Driving;
Aaron, 10:04, Texting;
Aaron, 10:05, Normal Driving;
Aaron, 10:10, Calling;
...}

FIG. 10

SYSTEMS AND METHODS REGARDING IMAGE DISTIFICATION AND PREDICTION MODELS

CROSS REFERENCE TO RELATED APPLICATIONS

The present application is a continuation of U.S. patent application Ser. No. 15/596,155, entitled "SYSTEMS AND METHODS REGARDING IMAGE DISTIFICATION AND PREDICTION MODELS," filed on May 16, 2017, the disclosure of which is hereby incorporated herein by reference.

FIELD OF THE DISCLOSURE

The present disclosure generally relates to systems and methods for providing 2D and 3D imagery interpolation, and more particularly to predictive modeling and classifications using 2D and 3D imagery.

BACKGROUND

Images and video taken from modern digital camera and video recording devices can be generated and stored in a variety of different formats and types. For example, digital cameras may capture dimensional (2D) images and store them in a vast array of data formats, including, for example, JPEG (Joint Phonographic Experts Group), TIFF (Tagged Image File Format), PNG (Portable Network Graphics), BMP (Windows Bitmap), or GIF (Graphics Interchange Format). Digital videos typically have their own formats and types, including, for example, FLV (Flash Video), AVI (Audio Video Interleave), MOV (QuickTime Format), WMV (Windows Media Video), and MPEG (Moving Picture Experts Group).

These 2D formats are typically based on rasterized image data captured by the camera or recording device where the rasterized image data is typically generated and stored to produce a rectangular grid of pixels, or points of color, viewable via a computer screen, paper, or other display medium. Other 2D formats may also be based on, for example, vector graphics. Vector graphics may use polygons, control points or nodes to produce images on a computer screen, for example, where the points and nodes can define a position on x and y axes of a display screen. The images may be produced by drawing curves or paths from the positions and assigning various attributes, including such values as stroke color, shape, curve, thickness, and fill.

Other file formats can store 3D data. For example, the PLY (Polygon File Format) format can store data including a description of a 3D object as a list of nominally flat polygons, with related points or coordinates in 3D space, along with a variety of properties, including color and transparency, surface normal, texture coordinates and data confidence values. A PLY file can include can include large number of points to describe a 3D object. A complex 3D object can require thousands or tens-of-thousands of 3D points in a PLY file to describe the object.

A problem exists with the amount of different file formats and image types. Specifically, while the use, functionality, and underlying data structures of the various image and video formats are typically transparent to a common consumer, the differences in the compatibility of the various formats and types creates a problem for computer systems or other electronic devices that need to analyze or otherwise coordinate the various differences among the competing formats and types for specific applications. This issue is exacerbated because different manufacturers of the camera and/or video devices use different types or formats of image and video files. This combination of available different file formats and types, together with various manufacturer's decisions to use differing file formats and types, creates a vast set of disparate image and video files and data that are incompatible and difficult to interoperate for specific applications.

BRIEF SUMMARY

Accordingly, there is a need for systems and methods to provide compatibility, uniformity, and interoperability among the various image file formats and types. For example, certain embodiments disclosed herein address issues that derive from the complexity and/or size of the data formats themselves. For example, a 3D file, such as a PLY file can have tens-of-thousands numbers of 3D points to describe a 3D image. Such a fine level of granularity may not be necessary to analyze the 3D image to determine, for example, items of interest within the 3D image, such as, for example, human features or behaviors identifiable in the 3D image.

Moreover, certain embodiments herein further address that each 3D file, even files using the same format, e.g., a PLY file, can include sequences of 3D data points in different, unstructured orders, such that the sequencing of 3D points of one 3D file can be different from the sequencing of 3D points of another file. This unstructured nature can create an issue when analyzing 3D images, especially when analyzing a series of 3D images, for example, from frames of a 3D movie, because there is no uniform structure to comparatively analyze the 3D images against.

For the foregoing reasons, systems and methods are disclosed herein for "Distification" of 3D imagery. As further described herein, Distification can provide an improvement in the accuracy of predictive models, such as the prediction models disclosed herein, over known normalization methods. For example, the use of Distification on 3D image data can improve the predictive accuracy, classification ability, and operation of a predictive model, even when used in known or existing predictive models, neural networks or other predictive systems and methods.

As described herein, a computing device may provide 3D image Distification by first obtaining a three dimensional (3D) image that includes rules defining a 3D point cloud. The computing device may then generate a two dimensional (2D) image matrix based upon the 3D image. The 2D image matrix may include 2D matrix point(s) mapped to the 3D image. Each 2D matrix point can be associated with a horizontal coordinate and a vertical coordinate. The computing device can generate an output feature vector that includes, for at least one of the 2D matrix points, the horizontal coordinate and the vertical coordinate of the 2D matrix point, and a depth coordinate of a 3D point in the 3D point cloud of the 3D image. The 3D point can have a nearest horizontal and vertical coordinate pair that corresponds to the horizontal and vertical coordinates of the at least one 2D matrix point.

In some embodiments, the output feature vector may indicate one or more image feature values associated with the 3D point. The feature values can define one or more items of interest in the 3D image. The items of interest in the 3D image can include, for example, a person's head, a person's facial features, a person's hand, or a person's leg.

In some aspects, the output feature vector is input into a predictive model for making predictions with respect to the items of interest.

In some embodiments, the output feature vector can further include a distance value generated based on the distance from the at least one 2D matrix point to the 3D point. In other embodiments, a total quantity of the 2D matrix points mapped to the 3D image can be less (i.e., to create a courser granularity) than a total quantity of horizontal and vertical coordinate pairs for all 3D points in the 3D point cloud of the 3D image.

In other embodiments, the 3D imagery, and rules defining the 3D point cloud, are obtained from one or more respective PLY files or PCD files. The 3D imagery may be a frame from a 3D movie. The 3D images may be obtained from various computing devices, including, for example, any of a camera computing device, a sensor computing device, a scanner computing device, a smart phone computing device, or a tablet computing device.

In other embodiments, Distification can be executed in parallel such that the computing device, or various networked computing devices, can Distify multiple 3D images at the same time.

Distification can be performed, for example, as a preprocessing technique for a variety of applications, for example, for use with 3D predictive models. For example, systems and methods are disclosed herein for generating an image-based prediction model. As described, a computing device may obtain a set of one or more 3D images from a 3D image data source, where each of the 3D images are associated with 3D point cloud data. In some embodiments, the 3D image data source is a remote computing device (but it can also be collocated). The Distification process can be applied to the 3D point cloud data of each 3D image to generate output feature vector(s) associated with the 3D images. A prediction model may then be generated by training a model with the output feature vectors. For example, in certain embodiments, the prediction model may be trained using a neural network, such as a convolutional neural network.

In some embodiments, training the prediction model can include using one or more batches of output feature vectors, where batches of the output feature vectors correspond to one or more subsets of 3D images from originally obtained 3D images.

In certain embodiments, the 3D images used to generate the prediction model may depict driver behaviors. The driver behaviors can include, for example, driver gestures such as: left hand calling, right hand calling, left hand texting, right hand texting, eating, drinking, adjusting the radio, or reaching for the backseat. The prediction model may determine a driver behavior classification and corresponding probability value for a 3D image, where the probability value can indicate the probability that the 3D image is associated with a driver behavior classification, e.g., "eating." The 3D image may then be associated with the driver behavior classification, such that the 3D image is said to identify or otherwise indicate the driver behavior for the driver.

In some embodiments, the driver behavior classification and the probability value can be transmitted to a different computing device, such as a remote computing device or a local, but separate computing device.

Distification can also be used for interoperating 3D imagery with 2D imagery. For example, the differing file formats and types are especially problematic when comparing or attempting to interoperate 3D and 2D image types, which typically have vastly different file formats tailored to 3D and 2D imagery, respectively. For example, a 2D JPEG image uses a rasterized grid of pixels to form an image. 2D images are typically concerned with data compression (for file size purposes), color, and relative positioning (with respect to the other pixels) within the rasterized grid forming the image, and are typically not concerned with where the pixels or points of the 2D image that are within, for example, some larger space outside of the rasterized grid. 3D images, on the other hand, depend on 3D coordinates and positioning in 3D space in order to represent a 3D object built, for example, by numerous polygon shapes that each have their own vertices (e.g., x, y and z coordinate positions) that define the position of the polygons, and, ultimately, the object itself in 3D space. Other attributes of a 3D file format may be concerned with color, shape, texture, line size, etc., but such attributes are typically indicated in a 3D file in a completely different format from 2D file formats to accommodate the rendering of the images in 3D space versus 2D rasterisation.

For the foregoing reasons, systems and methods are disclosed herein for generating an enhanced prediction from a 2D and 3D image-based ensemble model. As described herein, a computing device may be configured to obtain one or more sets of 2D and 3D images. Each of the 2D and 3D images may be standardized to allow for comparison and interoperability between the images. In one embodiment, the 3D images are standardized using Distification. In addition, corresponding 2D and 3D image pairs (i.e., a "2D3D image pair") may be determined from the standardized 2D and 3D pairs where, for example, the 2D and 3D images correspond based on a common attribute, such as a similar timestamp or time value. The enhanced prediction may utilize separate underlying 2D and 3D prediction models, where, for example, the corresponding 2D and 3D images of a 2D3D pair are each input to the respective 2D and 3D prediction models to generate respective 2D and 3D predict actions.

The predict actions can include classifications and related probability values for those classifications for each of the 2D and 3D images. For example, the 2D prediction model may generate a 20% value for a "texting" class for a given 2D image and the 3D prediction model may generate a 50% value for the same "texting" class for a given 3D image, such as a 3D image paired with the 2D image in the 2D3D image pair. The ensemble model may then generate an enhanced prediction for the 2D3D image pair, where the enhanced prediction can determine an overall 2D3D image pair classification for the 2D3D image based upon the 2D and 3D predict actions. Thus, for example, the 2D3D image pair may indicate that the driver was "texting." In some embodiments, the enhanced prediction determines the 2D3D image pair classification by summing one or more probability values associated with the 2D predict actions and the 3D predict actions to determine a maximum summed probability value, wherein the maximum summed probability value is determined from the sums of one or more classification probability values associated with each of the 2D predict actions and the 3D predict actions. Thus, for the example above, the 20% probability value and the probably 50% value from the 2D and 3D models, respectively, could be summed to compute an overall 70% value. If the 70% summed value was the maximum value, when compared to other classifications, e.g., "eating," then the classification (e.g., "texting") associated with the maximum summed probability can be identified as the 2D3D image pair classification for the 2D3D image pair.

In some embodiments, the 2D and 3D images input into the ensemble model are sets of images defining a "chunk" of images sharing a common timeframe, such as images 2D and 3D images taken at the same time for a movie. In some embodiments, a chunk classification can be determined for the common timeframe, where the chunk classification is based on one or more 2D3D image pair classifications of the 2D3D image pairs that make up the movie.

In other embodiments, the ensemble model can generate a confusion matrix that includes one or more 2D3D image pair classifications. The confusion matrix can be used for further analysis or review of the ensemble model, for example, to compare the accuracy of the model with other prediction models.

In some embodiments, the ensemble model may be used to generate a data structure series that can indicate one or more driver behaviors as determined from one or more 2D3D image pair classifications. The driver behaviors can be used to determine or develop a risk factor for a given driver. As mentioned herein, the driver behaviors can include any of left hand calling, right hand calling, left hand texting, right hand texting, eating, drinking, adjusting the radio, or reaching for the backseat.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 4 illustrates a perspective view of an embodiment of a 2D image matrix generated from a 3D image.

FIG. 9 illustrates an exemplary embodiment of a confusion matrix.

FIG. 10 illustrates a text-based data structure that may be output from a predictive model.

The Figures depict preferred embodiments for purposes of illustration only. Alternative embodiments of the systems and methods illustrated herein may be employed without departing from the principles of the invention described herein.

DETAILED DESCRIPTION

Certain embodiments of the present disclosure relate to capturing, generating, storing, and/or transmitting 2D and 3D imagery. In various embodiments, the 2D and 3D imagery may relate to vehicular drivers operating an automobile or other vehicle. The 2D and 3D imagery may be used to make predictions using various systems and methods, as disclosed herein, such as predictive models using a Distification technique or ensemble models that make predictions based on combined 2D and 3D imagery analysis.

In various embodiments, a computing device, such as a camera, sensor or scanner, can capture, generate, and/or store imagery data, such as 2D or 3D imagery data associated with an environment, setting, or for a particular purpose for which the 2D or 3D imagery is to be used.

The 2D or 3D imagery data can be used to train a predictive model, for example, via machine learning. The predictive model may be trained in a variety of machine learning techniques, such as inputting the 2D or 3D imagery into a neural network using deep learning techniques.

In some embodiments, the predictive model can be used to classify and determine driver behavior. In such an embodiment, 2D or 3D images and data of a driver captured or generated from cameras, sensors or other devices within a vehicle can be used as input into the predictive model. The model could return as output an indication or classification of one or more driver behaviors that can include, for example, "calling," (using the right hand or the left hand), "texting" (using the right hand or left hand), "eating," "drinking," "adjusting the radio," or "reaching the backseat." A driver behavior of "normal" may also be identified, for example, if the driver has both hands on the steering wheel, one hand on the steering wheel and another on a stick-shift, etc. It is noted that, other driver behaviors, actions, or features are contemplated by the present disclosure and are not limited to the above examples.

The driver behavior output can be used in a variety of applications. For example, the output can be used to determine a ranking or risk factor for a driver, for example, that includes an associate risk of the driver, for the purpose of underwriting an insurance premium. In some embodiments, for example, the total number of risky behaviors may be compared with the "normal" behaviors on a percent driving time basis to determine degree of risk (or lack thereof) for the particular driver. Additional uses and determinations of the driver behavior are further disclosed and described in the embodiments herein.

Figure 1:
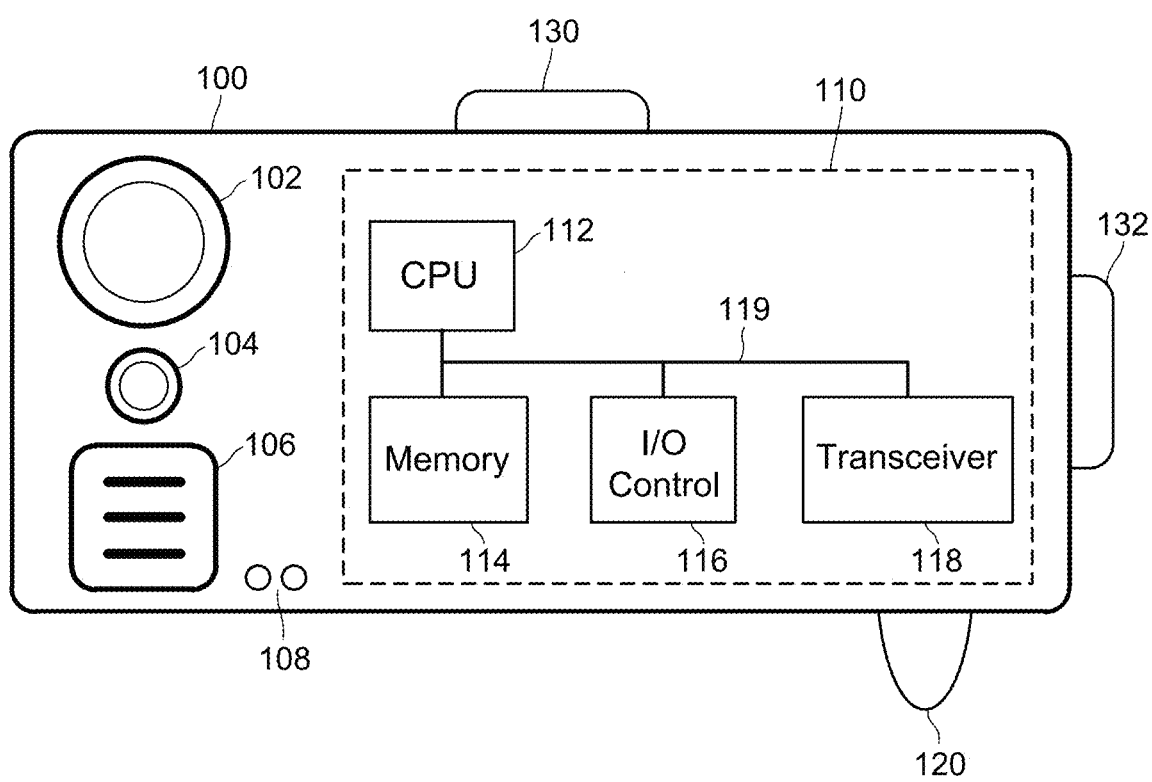
FIG. 1 illustrates an embodiment of an exemplary computing device for capturing, generating, storing, and/or transmitting or receiving 2D or 3D imagery.

FIG. 1 illustrates an embodiment of an exemplary computing device 100 for capturing, generating, storing, and/or transmitting and receiving 2D or 3D imagery. In certain embodiments, the computing device may be a portable device. For example, the computing device can be a tablet device or smart phone that includes image capture functionality, such as a built-in camera. In other embodiments, the computing device, or its components, may be installed as part of a larger device or equipment, such as within the dashboard of a vehicle or otherwise installed or mounted in an interior section of the vehicle. In other embodiments the computing device may be installed or mounted on an outside section vehicle, e.g., for capturing 2D and 3D images, and/or video associated with the vehicle, the vehicle's environment, operators or passengers of the vehicle, or pedestrians within the vehicle's environment.

The computing device 100 can include a camera 102 for capturing 2D and 3D images and video. In certain embodiments, the camera 102 may capture 2D images and video, for example, a 2D digital photograph or movie. The 2D images and video may be captured, generated or otherwise stored in various data formats, e.g., file formats, which can include rasterized, and/or vector data. The camera 102 may also capture 3D images and video, which can also include in various data formats, e.g., file formats, which can include rasterized and/or vector data. The videos for both the 2D and 3D embodiments can be stored in a series of image frames that depict respective 2D or 3D images at particular periods of time. For example, digital videos can be generated or captured as 2D or 3D images in individual frames, that when played back-to-back create the illusion of a motion picture. Frames can be captured at a "frame-per-second" rate, where higher frames-per-second videos appear more realistic and provide a higher movie quality than videos with lower frames-per-second.

For example, the videos may be captured at differing frames-per-second, e.g., 30 frames-per-second which would include 30 images per second of video time. The video images can include the same formats and types as the 2D or 3D images or may include a propriety format or type specific to the video format originally used to take the video. The 2D or 3D images may be captured with the full visible color spectrum or using other methods, such as infrared, thermal imaging, or low light-imaging. The camera 102 may be a number of different types, including, for example, normal lens, wide-angle lens, long-focus lens, fisheye lens, stereoscopic lens, ultraviolet lens, infrared lens, etc.

The computing device 100 may also include sensors or scanners, for example, sensor or scanner 104, that can collect or generate 2D or 3D images or imagery data, or, in certain embodiments, metadata related to such imagery data. For example, sensor 104 may use laser, infrared, or sonic transmissions to detect and capture 2D or 3D images or data of an object in the proximity of the camera. Sensor 104 may also provide temperature sensing, where sensor 104 could detect heat signatures, air temperature, or other temperature metrics in the computing device's proximity.

The computing device 100 may also include a number of user controls 106 used to configure the settings of the computing device 100. For example, the user controls 106 may be used to set the types of images (e.g., 2D and/or 3D) captured by the device, the file format(s) generated by the device, where and with what servers or other computing devices the computing communicates with, image quality, frames-per-second captured, or to configure any other setting, functionality or features of the computing device 100 as described herein.

The computing device 100 may also include one or more onboard input/output connection points 108, such as USB (Universal Serial Bus), 3.5 mm jacks, or similar physical connector types, that allow a user to connect the computing device 100 to another computing device (not shown), such as a computer, tablet or server, for direct transmission of the captured image data to that connected computing device.

The computing device 100 may include a number of processors, controllers or other electronic components for processing or facilitating the image capture, generation, storage or transmission as described herein. For example, the internal components 110 of computing device 100 may include a Central Processing Unit (CPU) 112 for controlling the camera 102, sensor 104, and for managing the other components of computing device 100 or equipment of the computing device 100. For example, the CPU 112 may control the process of capturing 2D or 3D images, video or data from camera 102 or sensor 104, and storing the images or data in memory 114.

Memory 114 can include any combination of Random Access Memory (RAM) or Read Only Memory (ROM) types for storing the image data or other data, such as metadata, captured by the computing device 100. The CPU 112 can communicate with memory 114 and the other components via bus 119. For example, the I/O controller 116 may be used to receive user commands signals from user controls 106, which are then transmitted via bus 119 to CPU 112 for processing the user commands (e.g., capture a 2D image). The CPU 112 may also communicate with transceiver 118 via bus 119 to transmit imagery or other data captured, generated or stored on the computing device 100 to another computing device, such as different computing device, computer, server, or remote device on a corporate network environment. The transceiver 118 may also receive data, for example, remote instructions to instruct the CPU 112 to change settings on the computing device 100, to capture 2D or 3D imagery, to transmit the 2D or 3D imagery, or otherwise control the operation of the computing device 100.

The computing device may include an antenna 120 connected, for example, to transceiver 118. The transceiver 118 and antenna 120 can be used for transmitting and receiving data, such as imagery data, captured by the device. In certain embodiments the computing device 100 does not provide image storage, for example, in memory 114. Instead, in such embodiments, the camera device merely captures and/or generates the imagery data and transmits the data to a different computing device, such a computer server or other computer, that may then store or process the imagery data. The data transmission may be facilitated by any various wireless protocols or standards, including, for example, the Bluetooth wireless protocol or the WiFi (e.g., IEEE 802.11) wireless protocol.

The computing device 100 may also include mounting hardware or otherwise mounting points 130, 132 for securing the computing device 100 to different surfaces, stands, or otherwise to affix or locate the camera in an optimal position to capture 2D or 3D imagery. In various embodiments, the location of the camera can depend, for example, on the environment or intended use for the computing device 100. For example, in one embodiment, the computing device may be mounted to the interior windshield or dashboard of a vehicle to capture 2D and/or 3D images, video or data of the operator of the vehicle. In other embodiments, the computing device may be attached to the exterior of the vehicle and used to capture images, video or data of the vehicle's operating environment.

In certain embodiments, the computing device 100 may include both 2D and 3D image capture, generation and/or storage. In other embodiments the camera device provides only 2D or only 3D image capture, generation, and/or storage. In some embodiments, multiple computing devices 100 may be used together (e.g., mounted in the same environment), where one computing device provides 3D images and another computing device provides 2D images to, together, capture, generate, or store 2D and 3D imagery.

Figure 2:
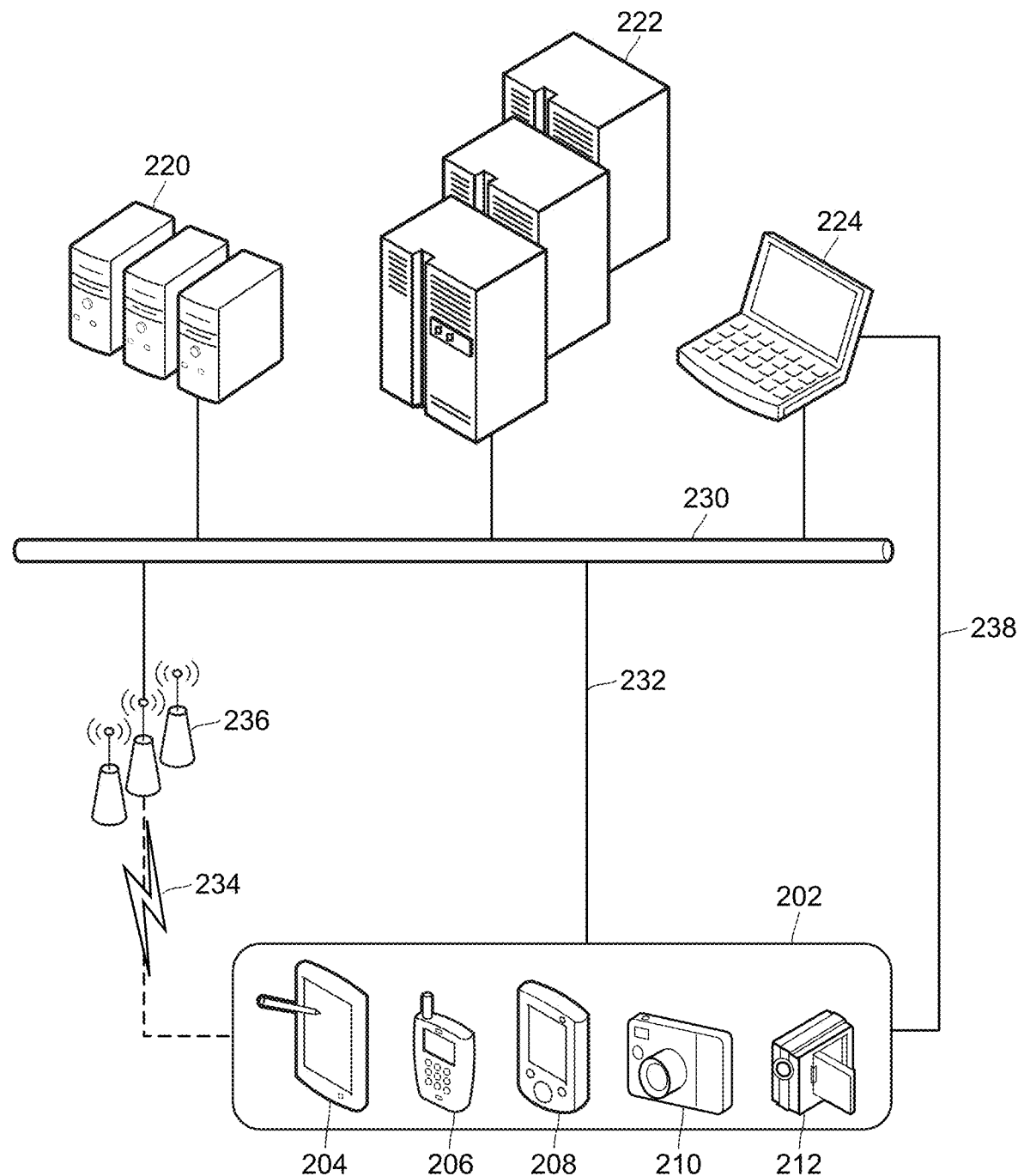
FIG. 2 illustrates an embodiment of an exemplary network diagram in which the computing device of FIG. 1 may be used.

FIG. 2 illustrates an embodiment of an exemplary network diagram in which the computing device of FIG. 1 may be used. For example, one or more computing devices 202 may operate within the network 200 to transmit or receive imagery or other data to other connected or remote computers, servers or other computing devices. As described for computing device 100 of FIG. 1, a computing device 202 may be any number of electronic imagery or camera devices for capturing 2D and 3D data, including, for example, tablet 204, smart phone 206, cell phone (not shown), personal data assistant 208, camera 210 or video camera 212, a webcam (not shown), or any other device which includes a combination of the components of any of these various devices, such as a custom designed proprietary device (not shown) designed for a specific use, for example, a custom designed proprietary 2D or 3D sensor camera mounted within in a vehicle.

A computing device 202 may connect directly or indirectly to a number of other computing devices, which can be collocated or remote. For example, the computing devices may be directly connect through 3.5 mm or USB wires (238) from the connectors 108 of the computing device to a computing device 224, which can be a laptop or personal computer. The physical connection 238 would allow the computing device 202 to transfer imagery or other data directly from the computing device 202 to the computing device 224. In another embodiment, a computing device 202 may be connected to the computing device 224 through a network connection 232 and a public network 230, such as the Internet, to allow for transfer of imagery or other data directly from the computing device 202 to the computing device 224. In other embodiments (not shown), the computing device may wirelessly transmit the imagery or other captured data from the computing device 202 to the computer 224 using, for example, Bluetooth technology or WiFi technology as defined by the IEEE 802.11 specification or other wireless transmission technologies.

In other embodiments, a computing device 202 may communicate to a cellular or mobile network, for example, via wireless communications 234 to one or more mobile network stations 236 to allow 2D or 3D image or video capture, generation, storage, and transmission to occur in a multitude of environments, e.g., such as in a vehicle or other situations where the computing device 202 is moving or changing positions. The wireless communications 234 can be any of those used by cellular or mobile devices, for example, including any of 3GPP, LTE, GSM or any other wireless communication standard. The computing device 202 may also receive information from the mobile network stations 236 or a wireless interface of computing device 224 (not shown), including configuration or setting instructions, as described herein with respect to FIG. 1 and computing device 100.

In other embodiments, a computing device 202 may transmit imagery or other data to one or more other computing devices, such as server(s) 220 or mainframe system(s) 222, located at a remote facility. The remote facility may be maintained by a company associated with the computing devices 202 or by a third party provider. Such imagery or other data may be stored by the servers 220 or mainframe systems 222. The stored imagery or other data may be obtained and analyzed at the time of transmission or at a later time, for example, by a user, or by systems, such as automated systems, collocated at the server(s) 220 or mainframe(s) 222.

In other embodiments the stored imagery or other data may be obtained and analyzed at the time of storage or at a later time by other users or systems with remote access to the stored data, for example, a user or computer program of computing device 224 that obtains the stored or transmitted imagery data from either server(s) 220 and/or mainframe(s) 222 via network 230.

3D Image Distification 3D images captured, generated and/or stored, as described herein, for example, for FIGS. 1 and 2, can include, in some embodiments, several thousands of points of 3D data. The number of 3D data points can vary based on the environment the data is captured in and based on the quality or resolution of the 3D image, which can further differ based on, for example, an intended end-use of the 3D images. For example, a 3D capture of a video involving a driver operating a vehicle may include 5 frames-per-second with 10,000 3D points per frame. Thus, for a 60 second movie, 3 million 3D points would be generated across all of the 3D frames (3D images) as captured or generated by a computing device for the 3D movie. In some embodiments, the 3D points may be represented in a point cloud, which is a set of data points in a given coordinate system. In a three-dimensional coordinate system, for example, the point cloud can be defined by horizontal, vertical, and depth coordinates (e.g., x, y, and z coordinates, respectively), that can, for example, in some embodiments, represent the external surface of an object. Point clouds can be created by 3D scanners, cameras, or sensors, for example, by any of the 3D scanners, cameras or sensors of computing devices described herein with respect to FIGS. 1 and 2.

In certain embodiments, the 3D images and point cloud data can be stored in 3D file formats, such as the PLY file format. The PLY file may store graphical objects that are described as a collection of polygons. A PLY file can consist of a header, followed by a list of points (e.g., vertices) and then, a list of polygons. The header specifies how many points or vertices, and polygons are in the file. The header may also state what properties are associated with each point or vertex, such as horizontal, vertical and depth (e.g., x, y, and z) coordinates and color. The PLY file format can have two sub-formats: an ASCII representation and a binary version for compact storage and for rapid saving and loading.

In other embodiments, point cloud data may be stored in the point cloud data (PCD) file format, which also stores 3D data (e.g., including multiple points each having x, y, and z coordinates), but in a different format from the PLY file format.

While it is useful in some contexts (particularly in 3D visualization) to use raw 3D images (e.g., 3D images captured, generated or stored by the computing devices of FIGS. 1 and 2), there can arise compatibility, data alignment or interpolation issues that arise when attempting to use the same raw 3D images in other contexts, for example, when attempting to use the raw 3D image with training or executing predictive models built from machine learning algorithms. In such contexts, for example, the unstructured 3D point cloud data of one 3D image (e.g., stored in a PLY file) could be misaligned with respect to the 3D point cloud data of another 3D image (e.g., stored in another PLY file). For example, if the first point of one raw PLY file represents a point identifying the head of a person, the first point of another raw PLY file could represent a point identifying a hand or a leg. This can create an issue because no meaningful connection can be made between the two 3D images with their differing ordering or arrangement of 3D points when training or executing predictive models with respect to such features.

Accordingly, various embodiments of the present disclosure relate to "Distifying" 3D imagery. In certain embodiments, the term "Distify" or "Distification" can refer to a 3D image pre-processing or normalization technique that transforms non-standardized or unstructured 3D imagery or 3D image data, such as 3D point cloud data, into a normalized set of uniform points that can be easily compared and used in a variety of applications, including machine learning, predictive models or other applications. Distification can provide an improvement in the accuracy of predictive models, such as the prediction models disclosed herein, over known normalization methods. For example, the use of Distification on 3D image data can improve the predictive accuracy, classification ability, and operation of a predictive model, even when used in known or existing predictive models, neural networks or other predictive systems and methods. Accordingly, Distification can be used to align data points in such a way that they can be comparable and usable by in a variety of applications. In other embodiments, "Distification" refers to data alignment and interpolation of 3D images or 3D image data, such as 3D Point cloud data, the output of which can be used, for example, to compare against 2D data from other sources, as further described herein.

For example, in certain embodiments, a Distify method can take the unstructured data of an original 3D image, such as from a PLY file, as input and can generate a uniform output feature vector by first creating a uniform 2D matrix of points. After creating the matrix, the Distify method can determine the nearest points in the original 3D point cloud of the 3D image with respect to one or more of the 2D matrix points. In certain embodiments, the output feature vector can contain a z-value of the nearest 3D point for one or more of the 2D matrix points in the 2D matrix. In other embodiments, the output feature vector can contain a distance value based on the distance between a 2D matrix point to a 3D point in the 3D point cloud.

A predictive model may be trained using one or more of the output feature vectors containing the 2D and 3D point data and machine learning techniques. Once the model is trained, future 2D and 3D point data may be used as input to the model so that the model can be used to make predictions. Such predictions can include, for example, determining or classifying a driver's behavior as described herein.

Figure 3:
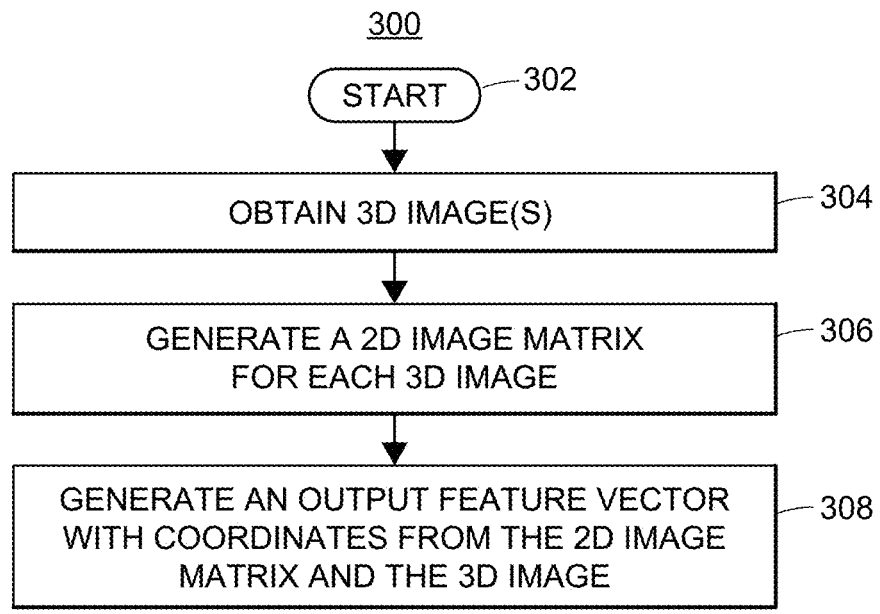
FIG. 3 illustrates a flow diagram of an exemplary embodiment of a Distification method.

FIG. 3 illustrates a flow diagram of an exemplary embodiment of a Distification method 300. Method 300 begins (block 302) where a computing device, such as any of the computing devices depicted in FIG. 1 or 2, e.g., computing devices 100, 202-212, 220, 222, or 224, obtain (block 304) one or more three dimensional (3D) images. In certain embodiments, the 3D images may be obtained directly from the computing devices that captured or generated the 3D images (e.g., devices 100, 202-212, 224). In other embodiments, the images may be obtained by from a computing device that stores the captured or generated 3D images (e.g., devices 220-224). The disclosure herein contemplates that any computing device in the 3D capture and generation life cycle (as described herein for FIG. 2) may execute (block 302) of the Distify method 300. The 3D images can be related such as, for example, pulled from a series of frames of a 3D movie, e.g., where 100 frames (i.e., images) are pulled from a 5 second segment of 3D movie with 20 frames per second.

In certain embodiments, each of the 3D images may include rules defining a 3D point cloud. The point cloud can define the surface of an object of the 3D image or otherwise define features or items of interest in the 3D image. In some aspects, the 3D images and/or rules may be defined in a 3D data file, such as a PLY file or PDC file.

At block 306, the computing device generates one or more two dimensional (2D) image matrices that correspond to the obtained 3D images. In one embodiment, a single, uniform 2D image matrix may be generated and used for all 3D images in the Distification method 300. Such an embodiment provides a high degree of compatibility and standardization across the 3D images to be normalized. In other embodiments, a 2D image matrix may be generated for each 3D image, for example, to provide greater control of the 3D images.

The 2D image matrix can include one or more 2D matrix points that are mapped to or are otherwise overlaid with the 3D image. Each 2D matrix point in the 2D matrix is associated with a horizontal coordinate (e.g., an x-value) and a vertical coordinate (e.g., a y-value). In certain embodiments, the 2D points of the 2D matrix can have a different level of granularity with respect to the 3D points in the 3D image. For example, a 2D matrix may be generated to include a total of 300 horizontal coordinates and 200 vertical coordinates, but a corresponding 2D-axis of the related 3D image, and for the same 2D dimensional space, may include a total of 900 horizontal coordinates and 400 vertical coordinates. In such embodiment, the two 2D surfaces would not share a one-to-one mapping with respect to the horizontal and vertical coordinates on each of the surfaces. In the current example, the 2D image matrix is said to have a more granular resolution the 2D-axis of the 3D image. Thus, in the current example, the total quantity of the 2D matrix points mapped onto the 3D image is less than the total quantity of horizontal and vertical coordinate pairs of the 3D points of the 3D image. Increasing the granularity of the 2D image matrix may increase the processing performance of the computing device because the computing device would have fewer points to analyze.

At block 308, the computing device generates an output feature vector that includes the horizontal coordinate and the vertical coordinate of at least one of the points in the 2D matrix. The output feature vector can be represented, for example, in any number of data structures in computer memory, such as the memories(s) of the computing devices of FIGS. 1 and 2 as described herein. Such data structures can include, for example, a data table, matrix, grid, array, multiple dimension array, hash, "struct," dictionary, vector, or any other data structure that may be used to arrange, organize or store the output feature vector in computer memory. Such data structures may be implemented in a variety of computer languages, for example, Python, Java, C++, C#, R or similar languages. In some embodiments, the output feature vector may be stored in RAM or ROM and used as input to machine learning algorithms or predictive models, as described herein.

In some embodiments, the output feature vector may associate a depth coordinate (e.g., a z-value) of a 3D point in the 3D point cloud of the 3D image with the horizontal and vertical coordinates of the 2D matrix point in the output feature vector. In some embodiments, the chosen 3D point can have the nearest horizontal and vertical coordinate pair in a 2D-axis with respect to the horizontal and vertical coordinates of the 2D matrix point. In such an embodiment, the output feature vector may also generate and associate a distance value with the 2D matrix point based on the distance from the 2D matrix point to the chosen 3D point. In some embodiments, the distance value can be the Euclidean distance (i.e., straight-line or ordinary) distance between two points in 3D space. Other distance values can be determined by different distancing techniques, such as the Chebyshev distance, the Manhattan distance, etc.

In some embodiments, the output feature vector can include one or more image feature values associated with the chosen 3D point. The feature values can define one or more items of interest in the 3D image. For example, in one embodiment, items of interest in the 3D image can include a person's head, a person's hand, or a person's leg or other human characteristics, features, or activities identifiable in the 3D image. In other embodiments, features or items of interest can define more general aspects of the image, such as edges, curves, points, vertices, or other aspects of the image. In one embodiment, for example, edges or curves or lines may be characteristic of a human head, eye, or mouth.

FIG. 4 illustrates a perspective view of an embodiment of a 2D image matrix generated from a 3D image. For example, the 2D image matrix and 3D image may be those described with respect to the Distify method of FIG. 3. In FIG. 4, a 2D image matrix 402 is generated from raw 3D image 404, or, in some embodiments, from a 2D-axis associated with raw 3D image 404. The raw 3D image 404 can be associated with a 3D point cloud 406 which defines a set of depth coordinates (e.g., z-values) depicted in plane 408 and further associated with horizontal and vertical coordinates in the 2D-axis of the 3D image relative to the plane of the 2D image matrix 402.

The 2D image matrix 402 can include a number of horizontal and vertical coordinates, which are defined by the dimensions and points of the 2D image matrix. For example, as shown for FIG. 4, 2D image matrix 402 includes horizontal coordinates X1 (430), X2 (432) and Xe (434), where Xe defines the "end" X coordinate of the horizontal axis of the 2D image matrix. Similarly, 2D image matrix 402 includes vertical coordinates Y1 (430), Y3 (440) and Ye−1 (442), where Ye−1 defines the coordinate just before the "end" Y coordinate of the vertical axis of the 2D image matrix.

2D matrix points can be formed where each of the horizontal coordinates and vertical coordinates intersect in the 2D image matrix 402. For example, 2D matrix point 430 is formed by the intersection of horizontal coordinate X1 and vertical coordinate Y1. Similarly, 2D matrix point 442 is formed by the intersection of horizontal coordinate Xe and vertical coordinate Ye−1.

As depicted in FIG. 4, one or more 2D matrix points may map directly to corresponding 2D coordinates of the raw 3D image 404. For example, as indicated by the arrow, a 2D point 410 associated with raw 3D image 404 maps directly to point (X4, Y1) of the 2D image matrix 402. In another example, a 2D point 412 maps directly to point (X8, Y2) of the 2D image matrix 402. In another example, a 2D point 414 maps directly to point (X17, Y3) of the 2D image matrix 402.

As described herein, the 2D image matrix 402, in some embodiments, may have a higher level of granularity with respect to the corresponding 2D-axis of raw 3D image 404. For example, a 2D point (not shown) on the 3D image 404 may exist within the rectangular space defined by, for example, points (X17, Y3), (X18, Y3), (X17, Y4) and (X18, Y4). Such a 2D point would have no direct mapping to the 2D image matrix 404. In such cases, when the 2D image matrix has fewer overall points than the raw 3D image, the 2D image matrix 404 is described as having a coarser granularity of 2D coordinates with respect to the available 2D coordinates of the 3D image. The courser granularity may occur because the image resolution (e.g., regarding the number of pixels) of the 3D image is higher than the number of 2D matrix points of the generated 2D image matrix 404. A coarser level of granularity for the 2D matrix 404 may be desirable in some embodiments, for example, in order to improve the performance of the computing device because fewer 2D coordinates of the 2D image matrix, compared to a greater number of such coordinates in the 3D image, could require less computing resources to process for certain applications, for example, the generation of a corresponding output feature vector, where the complexity of the corresponding output feature vector could depend on the level of granularity of the 2D image matrix. Thus, in some embodiments, coarser output feature vectors could likewise provide an improvement in further applications, such as when the output feature vectors are used to train or execute predictive models, as described herein.

While a certain number of horizontal, vertical and depth coordinates are shown in FIG. 4, the number of coordinates and bounds can be different or modified. For example, in some embodiments, a 2D image matrix may include 500 horizontal coordinates and 300 vertical coordinates. Other embodiments may provide a finer level of granularity and include 900 horizontal coordinates and 400 vertical coordinates. In some embodiments, the number of horizontal and vertical coordinates may be chosen to match the 2D resolution of the 3D image to achieve a one-to-one direct match across all 2D points in the 2D image matrix with respective 2D coordinates associated with the 3D image.

Depth coordinates are typically modified by altering the resolution of the original point cloud associated with the 3D image. Accordingly, different levels of granularity with respect to the depth coordinates can be achieved by modifying the 3D image resolution of the raw 3D image 404.

In the embodiment of FIG. 4, the 3D point cloud 406 can define a number of points in 3D space. For example, 3D points 460, 462, and 464 each reside in the point cloud 406 of the 3D image 404. In certain embodiments, the 3D points 460, 462, and 464 could relate to items of interest in the 3D image 404, including for example, a distinguishing human characteristic or activity, such as a human head or hand, or a human hand reaching forward or backward, etc.

Each of the 3D points have a horizontal coordinate (e.g., x-value), vertical coordinate (e.g., y-value) and depth coordinate (e.g., z-value) defined by the point cloud 406 of the 3D image 404. Plane 408 indicates depth coordinates (z-values) defined in the original point cloud 406 of the 3D image, for example, depth coordinates Z1 (450), Z2 (452), and Ze (454), where Ze defines the "end" Z coordinate of the depth axis in the 3D point cloud.

In some embodiments, the 3D image 404 could include rules that define the 3D point cloud 406. For example, in some embodiments, the rules can require the 3D points to be defined in a certain ordering, sequence or format, such as with the ordering, sequencing, and formatting required by a 3D file format, e.g., the PLY or PCD file formats.

The 3D points (e.g., points 460, 462, and 464) in 3D point cloud 406 can each have a corresponding 2D coordinate pair (i.e., a horizontal and vertical coordinate pair) with respect to a 2D-axis of 3D image 404. As described above, there may be a direct mapping of the points of the 3D image 404 with respect to the 2D matrix points of the 2D image matrix 402. In other aspects, there may be no direct mapping of the points of the 3D image 404 with respect to the 2D matrix points of the 2D image matrix 402, such that a 3D point in the point cloud 406 resides within a rectangular 3D space defined by four 2D matrix points (not shown) of the 2D image matrix 402. For example, 3D point 464 resides within a 3D space defined by four 2D matrix points, for example, 2D matrix points (X17, Y3), (X18, Y3), (X17, Y4) and (X18, Y4) of the 2D image matrix 402, and has a depth coordinate (e.g., z-value) of Z4.

Because the 2D matrix points of the 2D image matrix 402 do not have a depth value (e.g., z-value), it is desirable, in certain embodiments, to determine a depth coordinate from the point cloud 406 of the 3D image 404 and associate that depth coordinate with one or more 2D matrix points. For example, 2D matrix point (X17, Y3) is directly mapped (414) to a point in 3D image 404. However, 3D point 464 resides within a 3D space defined by the four 2D matrix points (X17, Y3), (X18, Y3), (X17, Y4), and (X18, Y4), and, therefore is not directly mapped to 2D matrix point (X17, Y3). In one embodiment, a Distification method, as part of its normalization process, can determine a nearest 2D matrix point by analyzing the horizontal and vertical coordinates of 3D point 464 (i.e., a 3D coordinate pair) and then finding the finding the 2D matrix point on the 2D image matrix 402 that has horizontal and vertical coordinates (i.e., a 2D coordinate pair) with the least distance (nearest distance) to the 3D coordinate pair when measured in the 2D plane of the 2D image matrix 402. For example, if it is determined that 3D point 464 has a 3D coordinate pair that is nearest to the 2D coordinate pair of the 2D matrix point (X17, Y3), then the depth coordinate (z-value) of 3D point 464 could be associated with 2D matrix point (X17, Y3). As describe herein, in certain embodiments, a distance value (470), such as a Euclidean distance value, may be also generated for the distance or space between the 2D matrix point (X17, Y3) and the 3D point 464.

In certain embodiments, as described herein, an output feature vector can be generated that would include the horizontal and vertical coordinates (i.e., the 2D coordinate pair) of the 2D matrix point (X17, Y3) and the determined depth coordinate (z-value) of the 3D point 464 The output feature vector can also include the distance value 470.

Although the 2D image matrix 402, raw 3D image 404, point cloud 406, and other items of FIG. 4, are shown in perspective view in a 3D environment, FIG. 4 can represent a visualization of data structures and information generated or otherwise analyzed by, for example, a computing device, such as any of the computing devices of FIG. 1 or 2. The items of FIG. 4, such as the 2D image matrix 402, 2D matrix points (430, 434), point cloud 406, 3D points (460-464), may be represented in the computing device, such as within the computing's memory, in various data structures including, for example, a data table, matrix, grid, array, multiple dimension array, hash, "struct," dictionary, vector, or any other data structure that may be used to arrange or organize the items of FIG. 4 in computer memory. Such data structures may be implemented in a variety of computer languages, for example, Python, Java, C++, C#, R or similar languages.

Figure 5A:
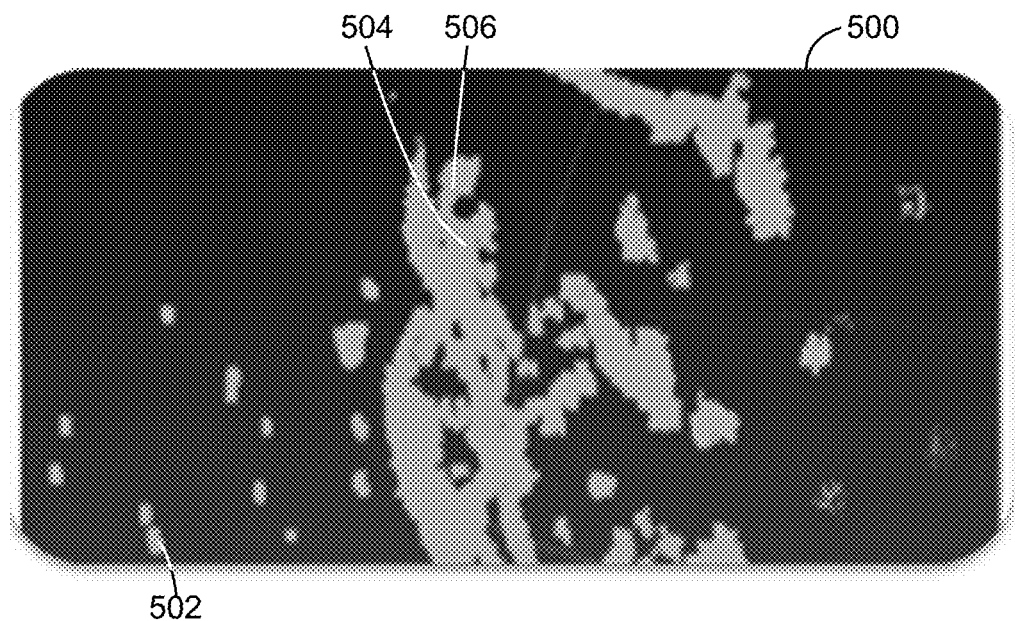
FIG. 5A depicts a view of an embodiment of a 3D visualization of a 3D image.

FIG. 5A depicts an embodiment of a view of 3D visualization 500 of a 3D image captured and/or generated by, for example, a 3D computing device, such as a 3D camera or 3D sensor device as described for FIGS. 1 and 2. In some embodiments, the 3D visualization 500 can be a visualization of a 3D point cloud. In certain embodiments, the 3D image, including a 3D point cloud, can be obtained from a 3D file, such as a PLY file.

The 3D visualization 500 can include a number of 3D points in the 3D image, for example, 3D points 502, 504 and 506. In the particular embodiment, the 3D visualization 500 is a 3D image (or frame) captured from a sensor on the dashboard of a vehicle and depicts a driver of the vehicle. For example, 3D point 504 defines a driver's face, near the cheek or lip area. 3D point 506 defines the driver's forehead. In certain embodiments, both 3D points 504 and 506 relate to items of interest in the 3D image. In contrast, 3D point 502 relates to an unknown item in the interior of the vehicle and, in some embodiments, can be considered "white noise," or not an item of interest.

Figure 5B:
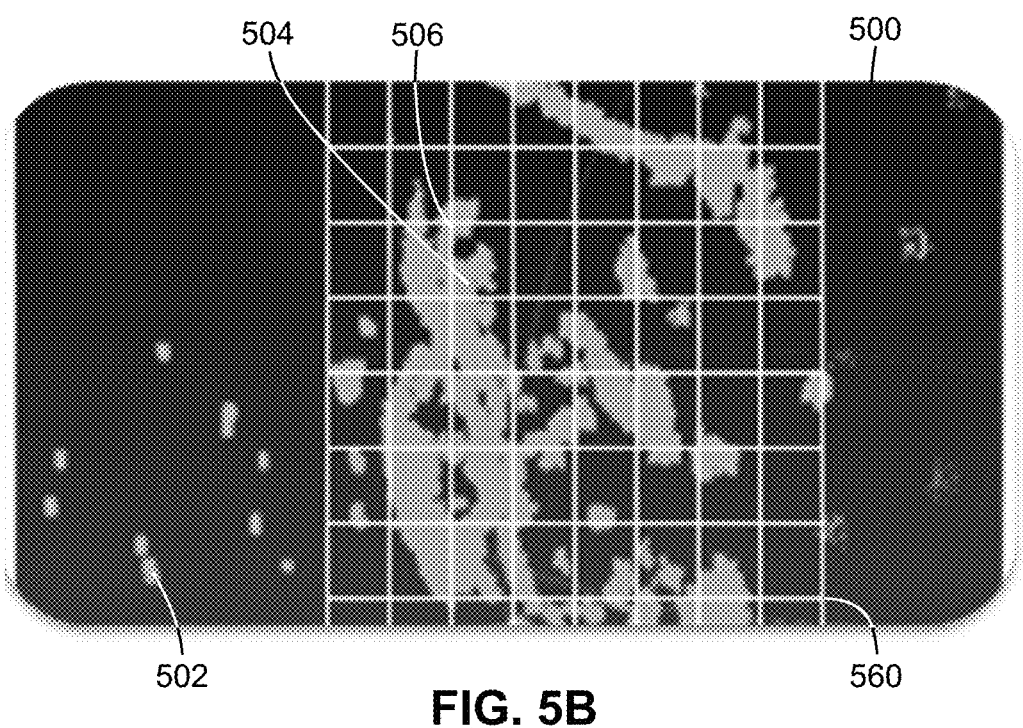
FIG. 5B depicts the 3D visualization of the 3D image of FIG. 5A and a 2D image matrix mapped to the 3D image.

FIG. 5B depicts the same view of the 3D visualization 500 of the 3D image of FIG. 5A, but also incorporates a generated 2D image matrix 560 mapped to the 3D image. The 2D image matrix 560 may be generated by the Distify method as described for FIGS. 3 and 4 herein. For example, the 2D image matrix 560 can correspond to the 2D image matrix 402 of FIG. 4, and, therefore, in some cases, the related disclosure with respect to the 2D image matrix 402 applies similarly with respect to 2D image matrix 560. Accordingly, the 2D image matrix 560 can be used to normalize a 3D point cloud associated with the 3D image of 3D visualization 500. For example, 3D point 506 (related to the driver's forehead) can be mapped directly to a 2D matrix point of 2D image matrix 560. In contrast, 3D point 504 (related to the driver's cheek or lip area) is not mapped directly to a 2D matrix point of the 2D image matrix 560, such that 3D point 504 could correspond to 3D point 464 of FIG. 4. Thus, as described for FIG. 4, the Distification method can associate the depth coordinate (e.g., z-value) of 3D point 506 with its directly mapped 2D matrix point because the horizontal and vertical coordinate pairs of both points would be the same, and, therefore would be the "nearest" points with respect to one another. 3D point 504, however, is not directly mapped to a particular 2D matrix point of the 2D image matrix 560. Thus, the Distification method could determine the nearest 2D matrix point for a 3D point as described, for example, for 3D point 464 of FIG. 4.

In certain embodiments as described herein, the 2D image matrix can be defined by horizontal and vertical (x and y) bounds, provided to a Distification method, such as method 300, and that define a certain window viewport within the 3D image. For example, as shown in FIG. 5B, the bounds of 2D image matrix 560 define a viewport that is smaller than the viewable area of the 3D image visualization 500 as a whole. In some embodiments, specifying a smaller bounds, and, therefore a smaller viewport, can be useful in targeting areas in an environment expected to yield items of interest in a captured or generated 3D image, for example, the driver seat of a vehicle to capture a driver as shown in visualization 500. This technique can be used to ignore white nose 3D points, such as 3D point 502. In addition, specifying a smaller bound can improve the performance of the systems and methods described that later analyze or operate on the 3D images, such as the Distify method 300, because a smaller bounded area (viewport) can have fewer overall 2D matrix points which requires less computer resources to process when compared to larger bounded area with more 2D matrix points.

The Distify method may call a number of functions to Distify 3D imagery as described herein. With respect to FIGS. 3, 4, and 5, for example, the Distify method may call the following function to generate, e.g., the 2D image matrix 402 from the raw 3D image 404 or the 2D image matrix 560 from the raw 3D image 500:

gen_coords(bounds, k)

The gen_coords function, in some embodiments, can generate and store the 2D matrix points of the 2D image matrix 402 (or 2D image matrix 560) in memory. In some embodiments, a return value of the gen_coords function can include an array of the 2D matrix points of the 2D image matrix to query when building an output feature vector. The bounds parameter of the gen_coords function can define the upper and lower bounds for of a 2D image matrix (e.g., to specify the number of horizontal and vertical coordinates that a 2D image matrix (e.g., matrix 402 or matrix 560) should have). Thus, the "bounds" coordinate can relate to boundaries of the 2D image matrix within a 3D image capture, for example, the x and y coordinates of a 3D image taken of a particular scene or position, where the x and y coordinates define the window or viewport of the 3D imagery being captured, which can include certain 3D data points or pixels of a 3D digital photograph or frame. The k parameter (472) can define the distance between each point in the 2d image matrix 402. Accordingly, by adjusting the bounds and k parameters, the granularity of the 2D image matrix (e.g., 402 or 560) can be modified.

Other functions may be used by the Distify method to Distify images taken from 3D files. For example, the Distify method may call the following function to generate an output feature vector based on a 3D file, such as a PLY file:

distify_frame(filepath_in, filepath_out, coords, total_frames)

In one embodiment, for example, the distify_frame function takes as input (as indicated by the file path of the filepath_in parameter) a single PLY file and creates the output feature vector for that file. The output feature vector can be output to the file path of the computer as indicated by the filepath_out parameter. The output feature vector can be generated by creating a k-d tree (a k-dimensional data structure to organize points in space with k dimensions) and querying the tree with the 2D image matrix created by the gen_coords function. When the k-d tree is queried, the output can include the distance to the nearest 3D point as describe herein. Thus, the distify_frame function can be used to provide the distance to the nearest 3D point to a 2D matrix point in the 2D matrix that was generated by the gen_coords function, as described herein. The coords parameter can be used to specify the coordinates of the 3D image (e.g., frame) to Distify or otherwise consider in a Distification process. The total_frames parameter can be used to specify a total number of frames to be Distified by the current call to the distify_frame function, such as, for example, one frame for a single 3D image or five frames for a movie comprised of multiple 3D images as described herein. Thus, for example, in some embodiments, Distification can be performed across a set of 3D files, for example, 3D PLY files. For example, in one embodiment, a set of related 3D files, for example, a set of 3D files related to frames of a 3D movie or sequential image capture may be provided to a muti-frame Distify function for processing.

The Distify method may also process two or more 3D images in parallel. For example, in certain embodiments, one or more computing devices running the Distify method may operate in a parallel process, where multiple computer threads are utilized to improve the performance of the 3D imagery processing. In such an embodiment each thread, for example, may work on a single fame (or multiple frames) at the same time. For example, the Distify method may call the following function to launch multiple threads to work on multiple frames at the same time:

distify(source, dest, bounds, k, n_jobs)

The Distify function can generate output feature vectors for an entire set of 3D images, for example, an entire set of 3D PLY files associated with a 3D movie. The Distify function can obtain one or more 3D images from a source location (such as any of the computing device sources described for FIG. 2), as indicated by the source parameter, and then call gen_coords function to create the 2D image matrix 402 based on the bounds and k parameters, as describe herein. Then, the Distify function can launch a number of threads (e.g., the number defined by the n_jobs parameter), thereby creating a parallel Distification process, so that multiple 3D image frames can be processed at the same time. In the parallel Distification embodiment, each individual 3D image, e.g., defined in PLY files, in a 3D data set can be provided to the distify_frame function. The Distify function completes once all the frames have been Distified by the various threads. Thus, the threads would operate in parallel thereby Distifying the several frames at the same time, rather than sequentially, thereby speeding up Distification of all frames as a whole.

In certain embodiments, the number of threads operating in parallel may be determined based on the computing device, such as any of the computing devices of FIGS. 1 and 2, that implements Distification. For example, a computing device with 4 CPU cores may run 4 threads at once. However, a more powerful computer, with 8 CPU cores, may run 10 threads at once.

The Distify method may also be implemented across several computing devices or systems (each having their own unique number of CPU cores) at once in a networked environment, for example, across any one or more of the computing devices shown in FIG. 2. In such an embodiment, the networked computers can be configured to Distify images or frames in a shared configuration, where certain computers can be allocated different workloads or threading tasks depending, for example, on the processing power of the individual computers. For example, a network of 10 computers may be used where the 3D data is allocated across the network, where 4 computers each having 4 CPU cores each run 4 Distification threads, and where the remaining 6 computers each having 8 CPU cores and each run 10 Distification threads, for a total of 84 total Distification threads allocated across the shared network running at the same time.

3D Image Distification and Prediction Models

Distify can be performed, for example, as a preprocessing technique for a variety of applications, including, for example, for generating output feature vectors used to train 3D predictive models or used as input into such predictive models to make predictions with respect to 3D imagery. In various embodiments described herein, the a 3D prediction model may be used to determine a risk factor associated with user activity or behavior.

For example, in the automobile insurance industry, a risk factor can be determined based on driver activity or behavior, such as, for example, gesture detection. Driver behavior can be categorized into distracted or unsafe driving behavior, such as, for example, using a phone while driving, texting while driving, and eating or drinking while driving. Driver behavior can also be categorized into normal or safe driving behavior, such as, for example, when the driver has two hands on the steering wheel, has eyes forward, or is otherwise operating the vehicle in a non-distracted manner. In certain embodiments disclosed herein, a risk factor for a given driver can be determined based on the identified driver behaviors for that driver. The risk factor may be developed over a given period of time, such as based on a single trip from a first location to a second location or based on multiple trips that indicate certain history or pattern of behavior.

Figure 6A:
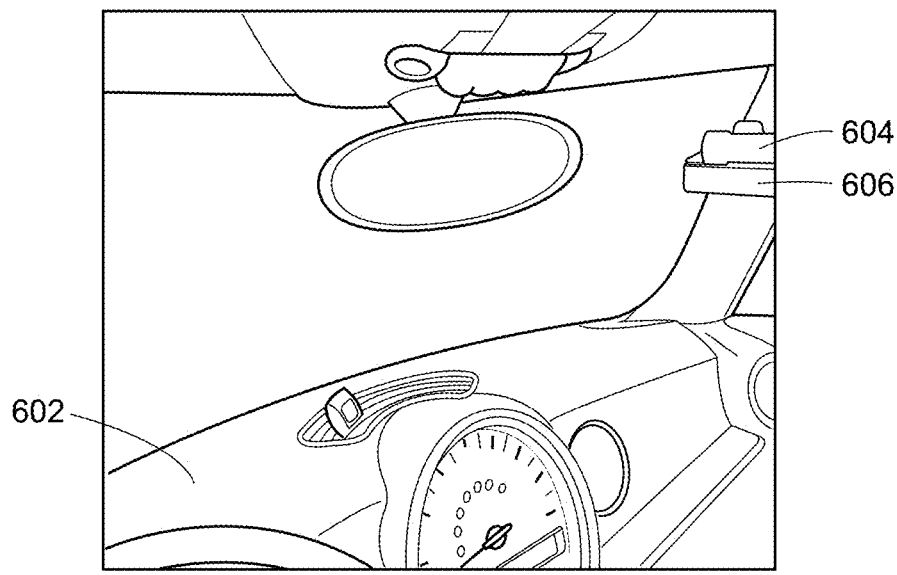
FIG. 6A shows an embodiment of computing devices mounted within a vehicle for image capture.

In certain embodiments, driver behavior may be identified by any number of computing devices, such as the computing devices described for FIGS. 1 and 2. FIG. 6A shows an embodiment of computing devices mounted within a vehicle for image capture. The embodiment of FIG. 6A depicts two computing devices 604 and 606 mounted above the dashboard 602 in the interior of a vehicle. In FIG. 6A, computing device 604 can be a webcam that takes 2D images and computing device 606 can be a 3D sensor. In other embodiments, as describe herein, a single computing device may be used that can capture both 2D and 3D images. Such a device may be, in some embodiments, hidden or otherwise mounted inside the dashboard or other area of the vehicle.

Figure 6B:
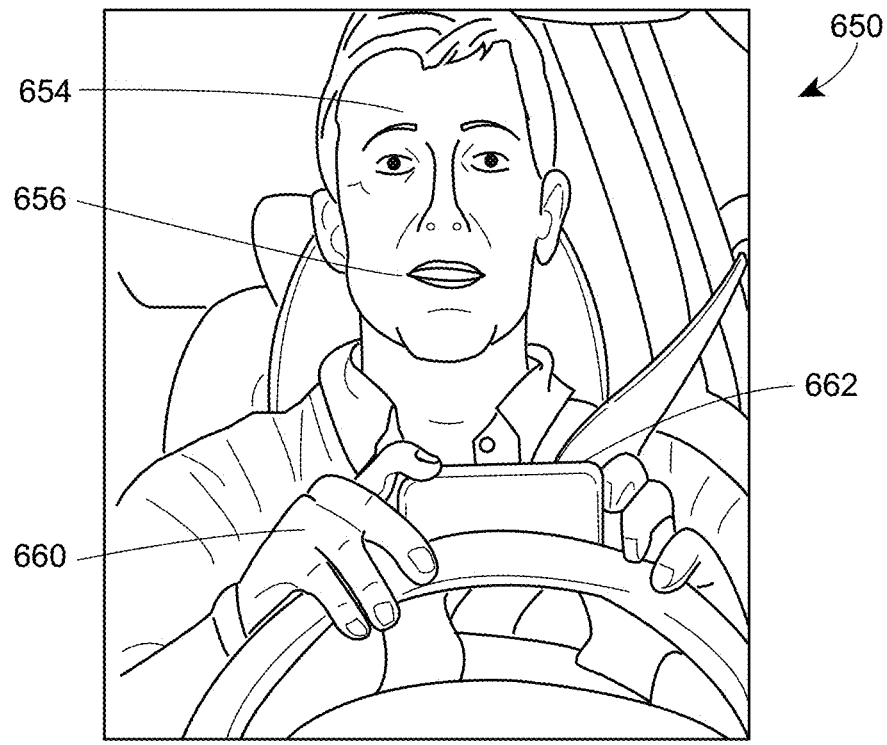
FIG. 6B illustrates an embodiment of an example image captured from the computing devices of FIG. 6A.

FIG. 6B illustrates an embodiment of an example image 650 captured from the computing devices of FIG. 6A. The image 650 can be either a 2D or 3D image, such as a raw JPEG (2D) image or raw PLY (3D) image having point cloud data. Image 650 depicts a driver and several types of identifiable driver behaviors, e.g., items of interest, that can be determined from points or pixels of the image. For example, point 654 of FIG. 6B, depicting the driver's forehead, can correspond to 3D point 506 of FIGS. 5A and 5B. Similarly, point 656 of FIG. 6B, depicting the driver's cheek or lip area, can correspond to 3D point 504 of FIGS. 5A and 5B. As described herein, the points 654 and 656 may be items of interest that may be used for identification (e.g., facial recognition to determine the position of the driver) or used by classification of driver behavior, or determination or development of a related risk factor value. For example, image 650 includes other items of interest, for example, as identified by points 660 and 662. Point 660 relates to the driver's hand, which, as shown, is on the steering wheel of the vehicle. In certain embodiments, the identifications of a driver's hand on the steering wheel could indicate safe driving, and thus, a risk value associated with the driver may be improved (e.g., a lowering the risk value). Point 662, however, relates use of a mobile phone. Accordingly, in certain embodiments, the identifications of use of a mobile phone could indicate dangerous or risky driving, and thus, the risk value associated with the driver may be adjusted accordingly (e.g., increasing the risk value).

In some embodiments, multiple points may be analyzed together by a prediction model to determine driver behavior. For example, the forehead (654) facing in the direction of the mobile phone (662), where the mobile phone (662) is located in close proximity to the driver's hand (660) could signal the identification of the behavior of use of a mobile phone, as described above.

In various embodiments, a prediction model could return as output an indication or classification of one or more driver behaviors that can include, for example, "calling," (using the right hand or the left hand), "texting" (using the right hand or left hand), "eating," "drinking," "adjusting the radio," or "reaching for the backseat." A driver behavior of "normal" or "safe" may also be identified, for example, if the driver has both hands on the steering wheel, one hand on the steering wheel and another on a stick-shift, etc. It is noted that, other driver behaviors, actions or features are contemplated by the present disclosure and are not limited to the above examples.

In some embodiments, the prediction models, such as a prediction model used to classify driver behaviors associated with image 650, can be generated and trained using machine learning techniques. In other embodiments, the prediction models may be generated from regression analysis used to create single or multivariate prediction models.

In various embodiments, for example, a 2D image or a 3D image prediction model may use a convolutional neural network ("ConvNet" or "CNN") model to classify image behaviors. CNNs are a machine learning type of predictive model that can be used for image recognition and classification. CNNs can operate on 2D or 3D images, where, for example, such images are represented as a matrix of pixel values. In certain embodiments, a Distification method may be used with a CNN model to predict driver behavior and/or gestures for 3D images.

Generally, a CNN can be used to determine one or more classifications for a given image by passing the image through a series of computational operational layers, as described herein. By training and utilizing theses various layers, a CNN model can determine a probability that an image belongs to a particular class.

For example, for the image 650 of FIG. 6B, the classifications and probabilities may be "normal driving" (20%) and "texting" (50%) as indicated by points 660 and 662, respectively, because, while the driver's hands are on the steering wheel (point 660) in the image 650 (which can increase the probability for "normal driving" classification), the use of the mobile phone (point 662) can increase the probability for the "texting" classification. In some embodiments, the identification of "texting" (or other negative driving behaviors) may be heavier weighted in the CNN model, such that an identification of "texting," etc., can increase the probability associated with the "texting" classification more than the identification of a "normal driving" classification.

In one embodiment, for each image or image data, a CNN can use four main operations (i.e., layers of the CNN), which include convolution, non-linearity, pooling, and classification. The convolution operation can extract features from an input image. Typically, convolution preserves the spatial relationship between pixels of an image by learning image features using small squares of input data from an image (such as pixels or groups of pixels of an image). The input data is taken from different portions (e.g., tiles or squares) of the original image where each input portion may be described as a "feature detector" (i.e., a "filter" or a "kernel"). The convolution operation applies (i.e., "slides") the filter across the pixels of the original image to generate one or more respective "convolved features" (i.e., "activation maps" or "feature maps") that describe the image. In this manner, the filters acts as feature detectors of the original input image, which may be used to determine items of interest.

A CNN can learn the values of the filters on its own during the training process, as described herein. Typically, the more filters, the more image features get extracted and the better the CNN becomes at recognizing patterns or features in images. The size of a feature map can be controlled by parameters determined before the convolution is performed. These parameters can include the "depth" of, or number of filters used, for the convulsion operation, which can be used to produce different feature maps. Feature maps may be envisioned as stacked 2D matrices of the image, so that a feature map using three filters would have a depth of three. Another parameter can be the "stride" value which is the is the number of pixels by which a filter slides over the image. Having a larger stride will produce smaller feature maps. Another parameter relates to "zero-padding," which is a method to pad the input image with zeros around the border. Padding allows control of the size of the feature maps.

Non-linearity is another operation or layer that can be used in a CNN. This operator is used to introduce non-linearity in into a CNN model because most real-world images and image data are non-linear. In contrast, the convolution operation is linear and provides an element-wise matrix multiplication and addition. Accordingly, non-linearity can be introduced into the model via a non-linear function such as ReLU, Tanh, or Sigmoid to improve the accuracy of the prediction model. For example, ReLU stands for Rectified Linear Unit and is an element-wise operation (applied per pixel) and can replace all negative pixel values in the feature map with different values, such as a zero value. The output feature map of the ReLU function can be referred to as the 'Rectified' feature map.

Pooling is another operation or layer that can be used in a CNN. Pooling (i.e., also "subsampling" or "downsampling") reduces the dimensions (e.g., number of pixel values) of each feature map but retains the most important information, such as the max, average, sum, etc. of the feature map. For example, in a max pooling embodiment, the largest element from a rectified feature map (e.g., the greatest value in a tile or group of pixels) may be identified and used as the representative value for the entire tile or group. In another embodiment, the average (Average Pooling) or sum of all elements in that group or tile could be used. In another embodiment, the pooling operation may use Distification, as describe herein, to determine the horizontal, vertical, or depth coordinates associated with a feature map and use any of the horizontal, vertical, or depth coordinates as the representative value for an entire tile or group.

Pooling reduces the spatial size of the input representation and provides several enhancements to the overall CNN model, including making the input representations (feature dimension) smaller and more manageable, reducing the number of parameters and computations in the network, therefore, controlling overfitting, and making the CNN resilient to small distortions and translations in the input image (e.g., because a small distortion in input will not change the maximum, average or Distified value of the output feature map). Thus, pooling allows detection of features, such as items of interest, in an image despite variances in images of a certain class.

In some embodiments, various multiples or permutations or numbers of the convolution, non-linearity, and pooling layers may be used for a CNN model. For example, in one embodiment, a 128×96 pixel image may be used as input for the model. A first convolution operation may include applying 32 3×3 filters to determine the edges of the image. A max pooling operation may analyze 2×2 tile portions of the of the output of the first convolution operation to determine the maximum value of each tile portion. A ReLU function may then be applied to the pooled image data to provide non-linearity to pooled image data. A second convolution function may then be applied, for example, 64 3×3 filters to determine the interior features of the image. Together these operations can extract the useful features from the images (e.g., items of interest), introduce non-linearity in the CNN model, and can reduce feature dimension to enhance computing performance. The above operations can be repeated any number of times for a single CNN. For example, some CNN may have tens of convolution and pooling layers. In addition, the ordering of the convolution, non-linearity, and pooling operations may differ. For example, it is not necessary to have a pooling operation after every convolutional operation.

The output from the convolutional, pooling, and non-linearity operations can represent high-level features of the input image and may further be used to generate a fully connected layer that ultimately provides the classification value(s). In CNNs, the term "Fully Connected" implies that every "neuron" (or node) in the previous layer is connected to every neuron on the next layer. For example, with respect to the above embodiment, there may be 128 fully connected layers. A fully connected layer, such as the 128 fully connected layers of the previous embodiment, can be used to generate classifications or provide predictions from the CNN model. In some CNN model embodiments, the sum of output probabilities from the fully connected layer is the value "1," although the CNN model can also be modified to sum some other value, such as, e.g., "100."

The CNN model may use the features learned from the convolutional, pooling, and non-linearity, and fully connected operations for classifying the input image into various classes based on a training dataset. Training a CNN can involve determining optimal weights and parameters of the CNN (as used in the various CNN operations described herein) to accurately classify images from the training set, and therefore, allow for better predictions. As described herein, the convolution, non-linearity, and pooling operators act as feature extractors from an input image and the fully connected layer acts as a classifier. For example, when a new (unseen) image is input into a CNN, the CNN can perform a forward propagation to output a probability for each class.

As described below, for a new image, the output probabilities are calculated using the weights which have been optimized to correctly classify all the previous training examples. For example, with respect driver behavior detection, in one embodiment, training and testing a CNN may include taking a large image data set, such as 72,000 images of 81 drivers. The input data set may be split into training and validation sets (e.g., a total of 67,000 images of 75 drivers) and a test set (e.g., 5,000 images of 6 drivers). The filters and weights of a raw CNN model may first be initialized with random values. Using the test set (e.g., 60,000 images of 71 drivers) as input, the CNN may then be forward propagated by applying the training set to the convolution, ReLU, pooling, and fully connected operations to determine output probabilities for each of a number of classifications. For example, the output probabilities for the classes "safe driving," "texting," and "calling" could be 0.6, 0.1, 0.3, respectively. Since the weights were randomly assigned in the first instance, the output probabilities would also be random and would likely contain error. At this point, a "backpropagation" technique can be used to calculate the error rates with respect to all weights in the network. Accordingly, an error rate for each of the random output probabilities can be determined by comparing, for each image, the predicted class to the actual class that the image belongs to. A total error of the model may then be computed based on the various error rates. All filter values and weights are updated in the CNN to minimize the total output error. The weights and other values can be adjusted in proportion to their contribution to the total error to minimalize the total error of the model.

After the model has been trained by reducing the error rate, the validation set (e.g., 7,000 images of 4 drivers) may then be input to test the updated model, which can give different output probabilities that are more accurate with respect to the actual images, e.g., 0.4, 0.2, and 0.4 for respective classes "safe driving," "texting," and "calling." In this way, the validation set can be used to further train the CNN model to classify particular images correctly by adjusting the model's weights or filters such that the output error is further reduced. In some embodiments, parameters like the number of filters, filter sizes, architecture of the network may all have been fixed before the CNN model is trained and, thus, would not require updates during training process. In such an embodiment, only the values associated with the filters and weights of the CNN get updated.

Finally, the test data set (e.g., 5,000 images of 6 drivers) may then be used to further determine the accuracy of the CNN model, e.g., whether and to what extent the CNN model correctly classifies new images.

In some embodiments, each of the training, testing, and validation stages may use multiple batches or cycles of images from each data set to train, validate or otherwise test the CNN model. For example, the CNN model may be trained during the training stage using 1000 images from the 67,000 images in the training data set thereby requiring 67 cycles, or batches, to fully train and prepare the CNN model for the validation stage.

Figure 7:
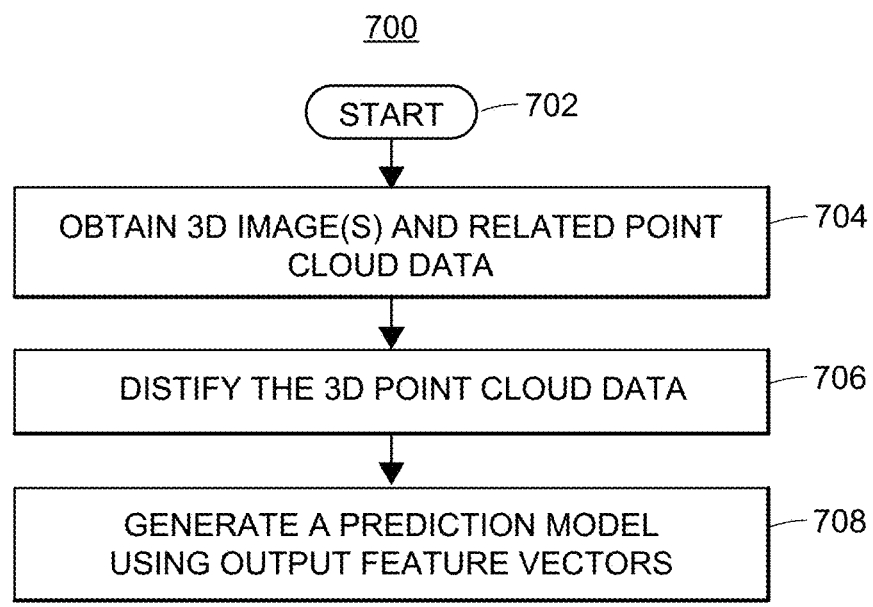
FIG. 7 illustrates a flow diagram of an exemplary method for generating an image-based prediction model that uses Distification.

A computing device, such as any of the computing devices described for FIGS. 1 and 2, may be configured to generate any of the prediction models described herein. For example, FIG. 7 illustrates a flow diagram of an exemplary method 700 for generating an image-based prediction model that uses Distification. The method begins (block 702) where a computing device obtains a set of three dimensional (3D) images from a 3D image data source (block 704). The data source can include, for example, any of the computing devices, such as cameras, computers, servers, or remote computing devices as describe for FIGS. 1 and 2. Each 3D image in the set can be associated with 3D point cloud data as described herein. The 3D point cloud data can either be computed before the image is obtained or afterwards.

At block 706, the computing device can then apply Distification to the 3D point cloud of the respective images, as described herein for FIGS. 3-5. The Distification process can generate output feature vectors associated with the 3D images. In certain embodiments, an output feature vector may be generated for each 3D image. In other embodiments, an output feature vector may be generated for several 3D images, where each of the several 3D images would correspond to a single output feature vector.

At block 708 the computing device can then generate a prediction model, for example, by training the model using the output feature vector(s). In certain embodiments, the prediction model is trained using a neural network, such as a convolutional neural network as described herein. In other aspects, the prediction model may be trained with batches of the output feature vector(s), where batches of the output feature vector(s) correspond with subset(s) of 3D images taken from the set of the one or more 3D images. Thus, for example, a set of 67,000 images may be batched into 1000 images subsets used to trained the model.

In other aspects, the 3D images of the prediction model of method 700 may relate to driver behaviors as described herein. After the model method 700 is generated, it may be used to classify 3D images. For example, a second set of 3D images may be input into the predictive model and used to determine, for each 3D image of the second set, a driver behavior classification and a corresponding probability value that indicates the probability that the 3D image is associated with the driver behavior classification. In some aspects, the classification with the highest probability value determines the overall image classification for the 3D image. In other aspects, multiple classifications and corresponding values are maintained for each of the 3D images.

In some embodiments, for some of the 3D images in the second set, the driver behavior classification and the probability value can be transmitted to a different computing device, such as remote computing device or any other device described for FIGS. 1 and 2, for further processing, analytics, or review.

2D Image and 3D Image Ensemble Prediction Models

Distification can be performed, for example, as a preprocessing technique for a variety of applications, including, for example, interoperating 3D with 2D imagery used for predictive models. In various embodiments disclosed herein, the generation and use of ensemble systems and methods are described that provide an enhanced ensemble predictive model by combining predictions and classifications from 2D prediction and 3D prediction models. An ensemble predicative model can produce more accurate predictions than the 2D or 3D image models alone. For example, in a test set of over 70,000 sample images depicting driver behavior, an ensemble prediction model correctly classified 96.9% of the images, whereas a stand-alone 3D CNN model and a stand-alone 2D CNN model were only able to correctly classify the same set of sample images with 93.9% and 86.1% accuracy, respectively.

As described herein, an ensemble model may use pairs of 2D and 3D images, where the pair of images are taken of the same object, scene or otherwise relate to the same frame. For example, 2D and 3D camera(s) or other computing device, for example, the computing devices disclosed for FIG. 1 or 2, can capture the pair of images simultaneously by, for example, focusing the 2D and 3D camera(s) on the same object or scene. For movie images, the 2D and 3D camera(s) can capture pairs of consecutive frames of 2D and 3D images that may be used for the ensemble model. As described herein, the 2D and 3D images can consist of various different formats and file types. Accordingly, in some embodiments descried herein, the captured 2D and 3D images are normalized into a standard format before training or otherwise using the enhanced ensemble predictive model for classification purposes.

Figure 8:
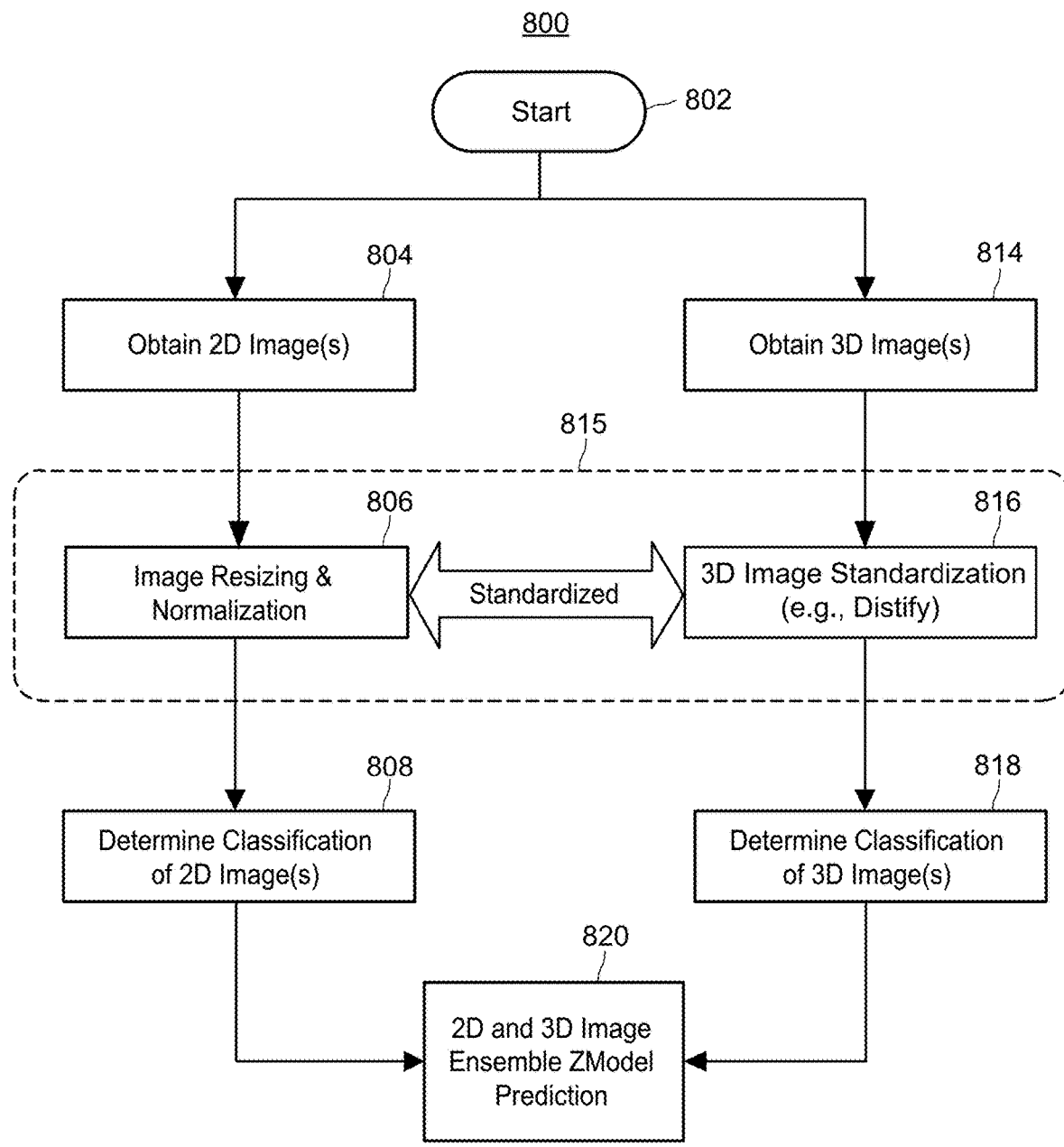
FIG. 8 illustrates a flow diagram of an exemplary method for generating an enhanced prediction from a 2D and 3D image-based ensemble model.

FIG. 8 illustrates a flow diagram of an exemplary method 800 for generating an enhanced prediction from a 2D and 3D image-based ensemble model. The method 800 may be implemented on a computing device, such as, for example, any of the computing devices described for FIGS. 1 and 2 herein.

At block 804 a computing device may obtain one or more sets of 2D image(s). The sets of 2D image(s) may include, for example, training image sets, validation image sets, and/or test image sets. Each set may include one or more 2D images or chunks of 2D images as described herein. In certain embodiments, the 2D images(s) may be JPEG images obtained from a computing device having a camera, such as a webcam.

Similarly, at block 814, the computing device may obtain one or more sets of 3D image(s). The sets of 3D image(s) may include, for example, training image sets, validation image sets, and/or test image sets. Each set may include one or more 3D images or chunks of 3D images as described herein. In certain embodiments, the 3D images(s) may be PLY-based images obtained from the same or a different computing device having a 3D sensor.

Either or both of the 2D image(s) or 3D image(s) of blocks 804 and 814 may be obtained from cameras or sensors collocated with the computing device or obtained from a different or remote computing devices, such as described for FIGS. 1 and 2.

In various embodiments, and with respect to blocks 804 and 814, an ensemble based model may obtain a "chunk" of one or more 2D or 3D images, such as a series or sets of 2D or 3D images from a certain timeframe (or time period) of a movie file or other set of related images. In certain embodiments, the size of the chunk (i.e., the number images to analyze in a particular timeframe, e.g., 20 frames per second over a 5 second timeframe) may be predetermined by the computing device or set by an operator of the computing device.

At block 815, the 2D and 3D images are standardized so that the potentially otherwise incompatible formats or file types of the 2D and 3D images can be compared for predictive purposes. For example, at block 806 a 2D image may be resized and normalized to a certain resolution. For example, in one embodiment, if a first group of the 2D image(s) obtained at block 804 were originally captured from a 5 megapixel camera device, then such 2D images would have 2560 pixels in the horizontal axis and 1920 pixels in the vertical axis. If a second group of the 2D images(s) obtained at block 804 were originally captured from a 3 megapixel camera device, then such then such 2D images would have 2048 pixels in the horizontal axis and 1536 pixels in the vertical axis. At block 806, each of the 5 megapixel 2D images and 3 megapixel 2D images may be downsized to generate a new images that represent the original images, but have only 640 (horizontal)×480 (vertical) pixels. In such a way, each of the 2D images obtained are resized and normalized into a common size and format, e.g., pixel resolution, for use in the ensemble prediction model.

At block 816, the 3D image(s) obtained at block 814 would be standardized and normalized to a format similar to the 2D image(s). For example, as for the 2D images, if multiple groups of 3D image(s) were obtained that had differing resolutions, then the 3D images could be resized and normalized as described above. In some embodiments, resizing and normalizing the images could require normalizing to the same resolution as the 2D images, e.g., to 640×480, if normalizing to resolution of the 2D images as described above. In other embodiments, the resizing and normalization could be involve using different resolutions or formats than for the 2D images, such as a similar resolution (720×576) or a different format that represented a similar resolution or format, and that still allowed for comparison or interoperability with the 2D images. For example, the 3D images could be Distified, as disclosed herein, which would provide standardization and normalization for the 3D images, for example, by using the output feature vectors in a 3D prediction model for use and comparison in the ensemble model with the 2D images, as describe herein.

In addition to providing interoperability for comparison purposes between the 2D and 3D images, standardization (e.g., via normalizing, downsizing, or Distification, etc.), as described in the foregoing embodiments, can also be useful in improving the performance of the ensemble predictive model because processing the smaller resolution images would require less computer resources and fewer processing cycles than compared with executing the ensemble model on the raw images alone. Other standardization and normalization procedures may additionally be used, such that the 2D images and 3D images become comparable or otherwise interoperable for purposes of use in the disclosed ensemble predictive model.

Once the 2D and 3D images have been standardized, the ensemble model proceeds to predict and classify the 2D and 3D images obtained in blocks 804 and 814, respectively. In various embodiments, the ensemble model analyzes predictions using separate 2D and 3D prediction models. For example, in some embodiments, various 2D and 3D models may have been trained and stored on a computing device (such as those described for FIGS. 1 and 2). In other embodiments, the 2D and 3D models may be trained at blocks 808 and 818 as part of method 800. The 2D and 3D models may be based on, for example, neural network models, such as convolutional neural network, that are trained using training image data sets, e.g., image data sets depicting driver behavior, as described herein. Other models based on different algorithms are also contemplated for the predictive models described herein, for example, a model based on a Random Forest algorithm, that uses a multitude of decision trees and that can output a prediction based on the computation of using the individual trees, such as averaging the tree values.

For example, at block 808, the ensemble model may read an underlying 2D model (e.g., load the underlying 2D model into the memory of the computing device) that was previously trained, for example, by a convolutional neural network. The underlying 2D CNN model may then be executed to determine actions for the 2D images obtained and normalized at blocks 804 and 806, respectively. In another embodiment, the 2D model may be generated and trained after receiving the 2D images. Similarly, at block 818, the ensemble model may also read an underlying 3D model (e.g., load the underlying 3D model into the memory of the computing device) that was previously trained, for example, by a convolutional neural network. The underlying 3D CNN model may then be executed to determine predict actions for the 3D images obtained and normalized at blocks 814 and 816, respectively. In another embodiment, the 3D model may be generated and trained after receiving the 3D images. In some embodiments, at least two different sets of 2D or 3D images obtained, one set for training and another used for testing, where the training set is used to generate the 2D or 3D models and the test set is used by ensemble model to make the enhanced predictions, as further described herein.

The 2D and 3D prediction models may be executed at blocks 808 and 818, respectively, by the ensemble model using, for example, the ensemble model's "predict" function, where the ensemble model can select the types of underlying 2D or 3D models to execute or train (e.g., CNN or Random Forest) and then provide the standardized 2D and 3D images to the selected models to make the respective 2D and 3D predict actions for training or execution purposes. In some embodiments, the ensemble model "predict" function can also pass a weights file to apply to either the underlying 2D or 3D models, where the weights file configures the weights used by the 2D or 3D model to make predictions, e.g., the weights of each neuron for a neural network based predictive model. In other embodiments, the ensemble model "predict" function can also pass identifiers that identify certain subset of data or images that the 2D or 3D model processes. For example, the identifiers may identify certain drivers (e.g., drivers with IDs 24 to 29) such that only 2D and 3D images identified for driver IDs 24 to 29 can be analyzed by the underlying predictive model. Accordingly, other images in the obtained 2D and 3D images may be ignored by the underlying models (e.g., images associated with drivers having IDs 1 to 23 may be ignored).

The predict actions from each of the 2D model and 3D model can then be returned to the ensemble model for further analysis. For example, the ensemble model's "predict" function may use the returned 2D and 3D predict actions to generate a predict data structure (e.g., such as a multi-dimensional array) that may include the 2D and 3D predict actions, real actions (if available), person index (e.g., if the driver identifiers were used), and a timestamp for each predict action corresponding to the timestamp of a the image of the 2D or 3D model prediction. The predict data structure can be, for example, a NumPy record array, which is multi-dimensional array of the Python programming language. However, other data structures, in other programming languages, (e.g., a multi-dimensional array in the Java or C# languages) can also be used. The predict data structure may also be sorted by any of the predict action, real action, person index, or timestamp values.

Once the ensemble model generates the predict data structure, the enhanced ensemble prediction may be generated (block 820), for example, by passing the predict data structure to the ensemble model's "ensemble" function. The ensemble function can analyze the 2D and 3D predict actions in the predict data structure to determine an enhanced prediction for each pair of corresponding 2D and 3D images (i.e., a "2D3D image pair"). The corresponding 2D3D image pair can be determined, for example, based on a 2D image and a 3D image having the same (or similar) timestamp, where the timestamps either have the same time value or a time value that differs, for example, by several seconds. The enhanced prediction can be based on probabilities of the classifications from each of the underlying 2D and 3D models of the ensemble model.

For example, in certain embodiments as described herein, the 3D model could generate output probabilities, e.g., 0.4, 0.2, and 0.4 for respective classes "safe driving," "texting," and "calling." The 3D output probabilities could be associated with a certain 3D predict action of the predict data structure. Similarly, the 2D model could generate output probabilities e.g., 0.1, 0.5, and 0.4 for respective classes "safe driving," "texting," and "calling." The 2D output probabilities could be associated with a certain 2D predict action of the predict data structure. The 2D and 3D output probabilities could correspond based on, e.g., a same or similar timestamp shared by the 2D and 3D images and related predict actions, thereby, creating a 2D3D image pair, as described above. In certain embodiments, the ensemble model may generate the enhanced prediction by summing the probabilities of each respective class of a 2D3D image pair and determining a 2D3D image pair classification from the class having the maximum summed probability. For example, the 3D output probabilities and 2D output probabilities of the 2D3D image pair described above may be summed to create a 2D3D image pair classification structure having summed classification values of 0.5, 0.7, and 0.8 for respective classes "safe driving," "texting," and "calling." Because the "calling" class has the maximum probability value (0.8), then the ensemble model generates an enhanced prediction of "calling," thereby classifying the 2D3D image pair, and the driver's behavior at the time the 2D3D image was captured, as a "calling" gesture.

In another embodiment, instead of summing the output probabilities of the classes for the 2D and 3D models of the respective 2D3D image pair, the classification having the largest probability across both the 2D and 3D output probabilities is determined as the classification for the 2D3D image pair. For example, the 3D output probabilities and 2D output probabilities of the 2D3D image pair described above may be analyzed to determine that that the 2D output probability of class "texting" has the maximum value (0.05). Because "texting" class has the maximum probability value (0.5) than any other class in either the 2D and 3D output probabilities, then the ensemble model generates an enhanced prediction of "texting," thereby classifying the 2D3D image pair, and the driver's behavior at the time the 2D3D image was captured, as a "texting" gesture.

Although summing and determining the maximum probability values are disclosed, other methods for generating the enhanced ensemble prediction are contemplated herein, such as, for example, by using logarithmic, multiplicative, or other functions to combine the predict action of the 2D and 3D models. In other embodiments, the 2D and 3D model predict actions may be input into a further prediction model used by the ensemble model, such as a further neural network model that receives the 2D and 3D model predict actions as input and outputs an enhanced prediction and classifications based on the 2D and 3D model predict actions.

In various embodiments, the ensemble model's ensemble function (at block 820) can analyze the predict actions in the predict data structure in "chunks" based on a common timeframe (e.g., 5 second video chunks). The timeframe may be specified by the computing device or operator of the computing device before execution of the ensemble model. In the chunk-based embodiment, the ensemble model can predict a 2D3D image pair classification, as described above, for each 2D3D image pair in the chunked timeframe. In certain embodiments, the ensemble model can generate a chunk classification based on all (or some) of the 2D3D image pair classifications in the chunk. For example, in one embodiment, a chunk of 5 seconds of 2D and 3D video images, with 20 frames (images) per second for each of the 2D and 3D images, would have 100 2D images and 100 3D images. The ensemble model can obtain, standardize and determine 2D and 3D classifications for the chunk of images as described above (blocks 802-818), yielding 100 2D3D image pairs. Using the enhanced prediction method described above, if 50 of the a 2D3D image pairs were classified as "texting," 30 as "calling," and 20 as "safe driving," then ensemble model could generate a prediction such that the chunk's overall classification is determined from the 2D3D image pair classification having the maximum count. In the above example, the chunk's classification would be "texting" since the "texting" class was predicted in a majority of the frames (i.e., 50 frames) of the 5 second video chunk. Thus, a chunk of one or more 2D or 3D images, as a whole, may be predicted as associated with a particular classification, even where, for example, one or more of the 2D or 3D images are not, individually, predicted to relate to that classification.

In certain embodiments, the ensemble model may analyze the 2D and 3D images in multiple chunks and provide multiple chunk classifications across an entire series or set of images, such as a series of images captured when a driver made a 10 minute (or longer) trip from a first location to a second location. In such an embodiment, the ensemble model may analyze the timestamps associated with each of the 2D and 3D images so that the chunk classifications are analyzed in a chronological order. In other embodiments, the ensemble model may validate each of the chunks in the series of images to determine if the 2D and 3D images to be used for the chunk are valid for the ensemble, for example, whether the 2D and 3D images to be used for the chunk have enough frames to be analyzed.

In some embodiments, one or more accuracy tests may be used determine the predictive accuracy of a prediction model, or otherwise compare the accuracy of the prediction models against one another. For example, an F-score may be computed for determining the accuracy of different ensemble prediction models. The F-score may be determined based on the number of true positive results returned from the ensemble model and the number of false positives and false negatives returned from the ensemble model. An example of a true positive result can be, for example, the correct classification of an image showing a "texting" driving behavior. A false positive can include, for example, the incorrect classification of "texting," e.g., for an image that in fact depicts "safe driving." A false negative can include, for example, failing to identify an image as "texting" when the image in fact shows "texting." The positive and negative results may be based on comparing the model's predictions and classifications for certain images against the actual classification for those images. Thus, a model that provides more true positive results than false negative or false positives would be determined more accurate than a model that has fewer true positive results than false negative and false positive results.

In some embodiments, the various true positives, false positives, false negative, etc. may be stored and/or presented in a "confusion matrix," which is a table or matrix data structure that can be used to indicate the classification performance of a predictive model on a set of test data for which the true values are known. The confusion matrix may also be used as a means to compare the accuracy against other predictive models or test the health of a predictive model. FIG. 9 illustrates an exemplary embodiment of a confusion matrix 900. Confusion matrix 900 indicates that a predictive model made 72,000 predictions (n=72,000), which could be, e.g., related to the number of images in an image data set. The image data set may have been tested in a predictive model, such as the 3D convolutional neural network or the ensemble model described herein. The confusion matrix 900 has two predicted classes: "No" (column 902) and "Yes" (column 904), that could, for example, indicate whether a driver behavior was predicted in an image, where "No" could indicate that no driver behavior was predicted and "Yes" could indicate that a driver behavior (e.g., "texting") was predicted. The confusion matrix 900 also has two actual classes: "No" (row 906) and "Yes" (row 908), that indicate whether the image actually had driver behavior, which could have been determined prior to execution of the predictive model.

As described above, confusion matrix 900 indicates that the prediction model made a total of 72,000 predictions (e.g., 72,000 driver images were input into the predictive model). From of those 72,000 cases, the predictive model predicted "Yes" 63,000 times (column 904), and "No" 9,000 times (column 902). However, the actual values for the images differ, e.g., 62,000 images (row 908) should have been predicted as "Yes" (i.e., a driver behavior should have been found in the image), and 10,000 images (row 906) should have been predicted as "No" (i.e., a driver behavior should not have been found in the image). The confusion matrix 900 indicates how accurate the model was in making predictions. For example, True positives (912) represent the cases in which the model predicted "Yes" (driver behavior predicted), and the actual image does have driver behavior. True negatives (910) represent cases in which the model predicted "No," and the actual image does not have driver behavior. False positives (916) represent cases where the model predicted "Yes," but the actual image does not have driver behavior (e.g., also known as a "Type I error."). Finally, false negatives (914) represent cases where the model predicted "No," but where the actual image does have driver behavior. (e.g., also known as a "Type II error.").

While FIG. 9 shows confusion matrix 900 for a binary classifier (i.e., a two classification system of "Yes" and "No" values), it is contemplated that the confusion matrix used for the disclosures herein can be extended to the case of more than two classes. For example, a confusion matrix may have three classes, e.g., high, medium, and low used to distinguish the accuracy of a predictive model based on the probability values associated with each of the images and where the image classifications are sorted in the confusion matrix into high, medium and low categories based on threshold values.

The confusion matrix 900 may be transmitted or stored as a data structure in a computing device, such as any of the computing devices descried for FIG. 1 or 2. In addition, while the confusion matrix 900 is shown in tabular format, the data structure of the confusion matrix may be presented in different data structure types, such as an array, a multi-dimensional array, a vector, a list, as hash, a dictionary, matrix, or other data structure.

In various embodiments, the output of a predictive model, for example, of any of the 2D, 3D, or ensemble prediction models as described herein, can provide or be used to generate a data structure or series of data structures relating to or descriptive of a driver's behavior. For example, FIG. 10 illustrates a text-based data structure 1000 that may be output from a predictive model based on a series of frames, images or chunks input into the model, where the series of frames or images relate to a driver operating a vehicle. The text-based output data structure 1000 can be, for example, in the Javascript Object Notation (JSON) format or some other text-based format. In other embodiments, the output format can be binary, for example, a serialized "struct" object of the C++ or C# programming language. The structure can also be non-text-based, for example, based on an numeric enumeration, where each number in the enumeration can indicate a specific value, e.g., the enumeration value "1" for "Normal Driving" and the enumeration value "2" for "Texting."

The text-based output data structure 1000 can include multiple entries of descriptive information detailing a driver's behavior as described herein. For example, data structure 1000 shows four separate entries 1002, 1004, 1006 and 1008. Each of the descriptive entries may include various details relating to the driver operating a vehicle. For example, each of the entries 1002-1008 indicate the driver's name, a timestamp indicating when the entry was recorded, and a driver behavior or action that was predicted by the prediction model based on a 2D and/or 3D image that was taken at the time indicated by the timestamp. For example, entry 1002 indicates that a driver named "Aaron" was operating the vehicle normally ("Normal Driving") at the time 10:01. Entry 1004 indicates that Aaron was "Texting" at the time 10:04 and entry 1005 indicates that Aaron reverted back to normal driving at the time 10:05. Five seconds later, at time 10:10, entry 1008 indicates that the predictive model determined that Aaron was making a call on his phone. Accordingly, data structure 1000 describes a 10 second timeframe, or chunk of time, when a driver (Aaron) was operating a vehicle and Aaron's various behaviors and actions over that time period.

Moreover, while the data structure 1000 shows a 10 second period of driver behavior, other time periods or timeframes are contemplated herein, for example, such as over an entire vehicular trip or over a series of days or months. In other embodiments, the data capture process can operate continuously, such that the computing device continuously captures images of the driver and the predictive model continuously provide an output of data structures, such as data structure 1000.

The data structures may also be used to determine a risk factor of the driver as described herein. For example, a computing device, such as a computing device described for FIG. 1 or 2, may take the data structure 1000, and from the entries, determine that a risk factor for the driver Aaron is 50% because two of the entries indicate "Normal Driving" and two of the entries indicate risky driving (i.e., "Texting" and "Calling"). In other embodiments, weights may be assigned to each of the behavior types so that different behavior types could disproportionately impact the driver's risk factor. For example, the texting entry 1004 could have a more negative impact on the driver Aaron's risk factor than the calling entry 1008 in a model that considered texting while driving a more risky activity than calling while driving.

In other embodiments, the quantity of driver behavior entries are measured and used to develop a driver's risk factor. For example a driver with a greater number of "Normal Driving" entries over a period of time would have a better risk factor than that of a driver that had the same number of entries over the same (or similar) period of time, but with fewer "Normal Driving" entries and some, for example, "Texting" or "Calling" entries. In other embodiments, a driver's risk factor could improve (or worsen) over time as a computing device (e.g., of FIG. 2) averages or otherwise compares the number of safe behavior entries (e.g., "Normal Driving") with a number of risky behavior entries (e.g., "Texting" or "Calling").

The data structures can be transmitted, received, stored, and used by a variety of computing devices. For example, the output data structures can be transmitted to any of the computing devices, e.g., computers, servers, or mainframes, described with respect to FIG. 2. In some embodiments, such output data structures can be analyzed when received or, in other embodiments, can be stored by such computing devices for later use or analysis. In other embodiments, the output data structures can be displayed by user or client devices, such as the computing devices, for example, tablet 204, smart phone 206, personal data assistant 208, laptop 224, or a display device (not shown) associated with servers 220 or mainframes 222.

Moreover, the output data structures and driver risk factors can be used in a variety of applications. For example, the driver risk factors can be used in consumer discount programs. In one embodiment, a driver with a lower risk factor may receive a greater discount on an insurance product or premium than a driver with a higher risk factor.

In another embodiment, the output data structures may be used for vehicle fleet management. For example, the manager of a fleet of vehicles can install computing devices (such as those of FIGS. 1 and 2) into the vehicles to capture 2D or 3D images of drivers, as described herein. In the current embodiment, the images of the drivers could be sent across a wireless network (e.g., 230, 234, 236) and processed by any number of computing devices (e.g., such as those in FIG. 2), for example, server(s) 220. The server(s) 220 could then provide an alert to the manager of the fleet of vehicles regarding any risky drivers or risky behaviors taken by drivers so that the manager can take appropriate action for those drivers, for example, such as requiring the driver to take a safety driving course.

In another embodiment, an output data structure and risk factors may be used in automated vehicle technology. For example, the computing devices could be configured to capture 2D or 3D images for the vehicles driving environment using the systems and methods described herein and then use those images to operate or partially operate the vehicle. In such an embodiment, the risk factor could be associated with risks in the driving environment, such as obstacles in the road and, in the current example, the output data structure would provide data entries, as described herein, to a system of the vehicle instructing the vehicle avoid the obstacle.

In another embodiment, output data structures, risk factors, images or other data captured, generated or stored, as described herein, may be used in academic research, for example, building, or describing additional models to improve driver safety.

Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A multi-dimensioning computing device configured to generate enhanced image-based prediction models based on two-dimensional (2D) image matrices determined from source three-dimensional (3D) images, the multi-dimensioning computing device comprising:
    an image processor;
    a memory communicatively coupled to the image processor;
    a distification component implemented on the memory and executing on the image processor to:
    obtain a set of one or more three dimensional (3D) images from a 3D image data source, wherein each 3D image in the set is associated with 3D point cloud data;
    initiate a distification enhancement using the 3D point cloud data of each 3D image, the distification enhancement including generating one or more output feature vectors based on each 3D image in the set; and
    generate an enhanced prediction model by training the enhanced prediction model using the one or more output feature vectors,
    wherein the memory of the multi-dimensioning computing device is updated with the enhanced prediction model to configure the multi-dimensioning computing device to output enhanced predictions from new 3D images based on the enhanced prediction model.

2. The multi-dimensioning computing device of claim 1, wherein training the enhanced prediction model further comprises using one or more batches of the output feature vectors, wherein the one or more batches of the output feature vectors correspond to one or more subsets of 3D images from the set of the one or more 3D images.

3. The multi-dimensioning computing device of claim 1, wherein the 3D image data source is a remote computing device.

4. The multi-dimensioning computing device of claim 1, wherein the enhanced prediction model is trained using a neural network.

5. The multi-dimensioning computing device of claim 4, wherein the neural network is a convolutional neural network.

6. The multi-dimensioning computing device of claim 1, wherein the set of one or more 3D images relate to one or more driver behaviors.

7. The multi-dimensioning computing device of claim 6, wherein the one or more driver behaviors include any one or more of the following: left hand calling, right hand calling, left hand texting, right hand texting, eating, drinking, adjusting the radio, or reaching for the backseat.

8. The multi-dimensioning computing device of claim 6, further configured to receive a second set of one or more 3D images as input into the enhanced prediction model to determine, for each 3D image of the second set, a driver behavior classification and corresponding probability value, wherein the second set of one or more 3D images relates to the one or more driver behaviors, and wherein the probability value indicates the probability that the 3D image is associated with the driver behavior classification.

9. The multi-dimensioning computing device of claim 8, wherein, for each 3D image of the second set, the 3D image is assigned an image classification equal to the driver behavior classification that has a greatest corresponding probability value.

10. The multi-dimensioning computing device of claim 8, wherein, for at least one of the 3D images in the second set, the driver behavior classification and the probability value are transmitted to a different computing device.

11. A multi-dimensioning method of generating enhanced image-based prediction models based on two-dimensional (2D) image matrices determined from source three-dimensional (3D) images, the multi-dimensioning method comprising:
    obtaining, with a distification component implemented on a memory and executing on an image processor, a set of one or more three dimensional (3D) images from a 3D image data source, wherein each 3D image in the set is associated with 3D point cloud data;
    initiating a distification enhancement using the 3D point cloud data of each 3D image, the distification enhancement including generating one or more output feature vectors based on each 3D image in the set; and
    generating an enhanced prediction model by training the enhanced prediction model using the one or more output feature vectors,
    wherein the memory of the multi-dimensioning computing device is updated with the enhanced prediction model to configure the multi-dimensioning computing device to output enhanced predictions from new 3D images based on the enhanced prediction model.

12. The multi-dimensioning method of claim 11, wherein training the enhanced prediction model further comprises using one or more batches of the output feature vectors, wherein the one or more batches of the output feature vectors correspond to one or more subsets of 3D images from the set of the one or more 3D images.

13. The multi-dimensioning method of claim 11, wherein the 3D image data source is a remote computing device.

14. The multi-dimensioning method of claim 11, wherein the enhanced prediction model is trained using a neural network.

15. The multi-dimensioning method of claim 14, wherein the neural network is a convolutional neural network.

16. The multi-dimensioning method of claim 11, wherein the set of one or more 3D images relate to one or more driver behaviors.

17. The multi-dimensioning method of claim 16, wherein the one or more driver behaviors include any one or more of the following: left hand calling, right hand calling, left hand texting, right hand texting, eating, drinking, adjusting the radio, or reaching for the backseat.

18. The multi-dimensioning method of claim 16, further comprising receiving a second set of one or more 3D images as input into the enhanced prediction model to determine, for each 3D image of the second set, a driver behavior classification and corresponding probability value, wherein the second set of one or more 3D images relates to the one or more driver behaviors, and wherein the probability value indicates the probability that the 3D image is associated with the driver behavior classification.

19. The multi-dimensioning method of claim 18, wherein, for each 3D image of the second set, the 3D image is assigned an image classification equal to the driver behavior classification that has a greatest corresponding probability value.

20. The multi-dimensioning method of claim 18, wherein, for at least one of the 3D images in the second set, the driver behavior classification and the probability value are transmitted to a different computing device.

* * * * *